(12) United States Patent
Malach

(10) Patent No.: US 9,681,313 B2
(45) Date of Patent: Jun. 13, 2017

(54) OPTIMIZING REMOTE ANTENNA UNIT PERFORMANCE USING AN ALTERNATIVE DATA CHANNEL

(71) Applicant: Corning Optical Communications Wireless Ltd, Airport (IL)

(72) Inventor: Adi Malach, Oranit (IL)

(73) Assignee: Corning Optical Communications Wireless Ltd, Airport (IL)

( * ) Notice: Subject to any disclaimer, the term of this patent is extended or adjusted under 35 U.S.C. 154(b) by 0 days.

(21) Appl. No.: 14/687,423

(22) Filed: Apr. 15, 2015

(65) Prior Publication Data

US 2016/0309340 A1 Oct. 20, 2016

(51) Int. Cl.
| | | |
|---|---|---|
| H04W 24/02 | (2009.01) | |
| H04L 5/00 | (2006.01) | |
| H04W 88/08 | (2009.01) | |
| H04B 7/26 | (2006.01) | |
| H04W 52/02 | (2009.01) | |
| H04W 72/04 | (2009.01) | |

(52) U.S. Cl.
CPC .......... *H04W 24/02* (2013.01); *H04B 7/2609* (2013.01); *H04L 5/001* (2013.01); *H04L 5/0057* (2013.01); *H04W 52/0238* (2013.01); *H04W 72/0406* (2013.01); *H04W 88/085* (2013.01); *Y02B 60/50* (2013.01)

(58) Field of Classification Search
CPC ............. H04W 24/02; H04W 72/0406; H04W 52/0238; H04B 7/2609
See application file for complete search history.

(56) References Cited

U.S. PATENT DOCUMENTS

| | | |
|---|---|---|
| 4,365,865 A | 12/1982 | Stiles |
| 4,449,246 A | 5/1984 | Seiler et al. |
| 4,573,212 A | 2/1986 | Lipsky |
| 4,665,560 A | 5/1987 | Lange |
| 4,867,527 A | 9/1989 | Dotti et al. |

(Continued)

FOREIGN PATENT DOCUMENTS

| | | |
|---|---|---|
| AU | 654192 B | 10/1992 |
| AU | 731180 B2 | 3/1998 |

(Continued)

OTHER PUBLICATIONS

Patent Cooperation Treaty, International Search Report for PCT/IL2016/059368, dated Aug. 9, 2016, 7 pages.

(Continued)

*Primary Examiner* — Nathan Mitchell
(74) *Attorney, Agent, or Firm* — C. Keith Montgomery

(57) ABSTRACT

A method and system for monitoring and optimizing a network may include configuring a remote antenna unit with a first transceiver for uplinking and downlinking a signal of a cellular service and with a second transceiver for uplinking and downlinking of the signal of at least one of a Bluetooth or Wi-Fi or Zigbee service. Performance data is collected from at least one user equipment configured for connecting to the remote antenna unit. The collected performance data is routed to a performance data collector configured to aggregate the performance data. The aggregated performance data is correlated. The network is optimized based on the correlated performance data.

26 Claims, 14 Drawing Sheets

(56) References Cited

U.S. PATENT DOCUMENTS

| | | |
|---|---|---|
| 4,889,977 A | 12/1989 | Haydon |
| 4,896,939 A | 1/1990 | O'Brien |
| 4,916,460 A | 4/1990 | Powell |
| 4,939,852 A | 7/1990 | Brenner |
| 4,972,346 A | 11/1990 | Kawano et al. |
| 5,039,195 A | 8/1991 | Jenkins et al. |
| 5,042,086 A | 8/1991 | Cole et al. |
| 5,056,109 A | 10/1991 | Gilhousen et al. |
| 5,059,927 A | 10/1991 | Cohen |
| 5,125,060 A | 6/1992 | Edmundson |
| 5,187,803 A | 2/1993 | Sohner et al. |
| 5,189,718 A | 2/1993 | Barrett et al. |
| 5,189,719 A | 2/1993 | Coleman et al. |
| 5,206,655 A | 4/1993 | Caille et al. |
| 5,208,812 A | 5/1993 | Dudek et al. |
| 5,210,812 A | 5/1993 | Nilsson et al. |
| 5,260,957 A | 11/1993 | Hakimi |
| 5,263,108 A | 11/1993 | Kurokawa et al. |
| 5,267,122 A | 11/1993 | Glover et al. |
| 5,268,971 A | 12/1993 | Nilsson et al. |
| 5,278,690 A | 1/1994 | Vella-Coleiro |
| 5,278,989 A | 1/1994 | Burke et al. |
| 5,280,472 A | 1/1994 | Gilhousen et al. |
| 5,297,225 A | 3/1994 | Snow et al. |
| 5,299,947 A | 4/1994 | Barnard |
| 5,301,056 A | 4/1994 | O'Neill |
| 5,325,223 A | 6/1994 | Bears |
| 5,339,058 A | 8/1994 | Lique |
| 5,339,184 A | 8/1994 | Tang |
| 5,343,320 A | 8/1994 | Anderson |
| 5,377,035 A | 12/1994 | Wang et al. |
| 5,379,455 A | 1/1995 | Koschek |
| 5,381,459 A | 1/1995 | Lappington |
| 5,396,224 A | 3/1995 | Dukes et al. |
| 5,400,391 A | 3/1995 | Emura et al. |
| 5,420,863 A | 5/1995 | Taketsugu et al. |
| 5,424,864 A | 6/1995 | Emura |
| 5,444,564 A | 8/1995 | Newberg |
| 5,457,557 A | 10/1995 | Zarem et al. |
| 5,459,727 A | 10/1995 | Vannucci |
| 5,469,523 A | 11/1995 | Blew et al. |
| 5,519,830 A | 5/1996 | Opoczynski |
| 5,543,000 A | 8/1996 | Lique |
| 5,546,443 A | 8/1996 | Raith |
| 5,557,698 A | 9/1996 | Gareis et al. |
| 5,574,815 A | 11/1996 | Kneeland |
| 5,598,288 A | 1/1997 | Collar |
| 5,606,725 A | 2/1997 | Hart |
| 5,615,034 A | 3/1997 | Hori |
| 5,627,879 A | 5/1997 | Russell et al. |
| 5,640,678 A | 6/1997 | Ishikawa et al. |
| 5,642,405 A | 6/1997 | Fischer et al. |
| 5,644,622 A | 7/1997 | Russell et al. |
| 5,648,961 A | 7/1997 | Ebihara |
| 5,651,081 A | 7/1997 | Blew et al. |
| 5,657,374 A | 8/1997 | Russell et al. |
| 5,668,562 A | 9/1997 | Cutrer et al. |
| 5,677,974 A | 10/1997 | Elms et al. |
| 5,682,256 A | 10/1997 | Motley et al. |
| 5,694,232 A | 12/1997 | Parsay et al. |
| 5,703,602 A | 12/1997 | Casebolt |
| 5,708,681 A | 1/1998 | Malkemes et al. |
| 5,726,984 A | 3/1998 | Kubler et al. |
| 5,765,099 A | 6/1998 | Georges et al. |
| 5,790,536 A | 8/1998 | Mahany et al. |
| 5,790,606 A | 8/1998 | Dent |
| 5,793,772 A | 8/1998 | Burke et al. |
| 5,802,173 A | 9/1998 | Hamilton-Piercy et al. |
| 5,802,473 A | 9/1998 | Rutledge et al. |
| 5,805,975 A | 9/1998 | Green, Sr. et al. |
| 5,805,983 A | 9/1998 | Naidu et al. |
| 5,809,395 A | 9/1998 | Hamilton-Piercy et al. |
| 5,809,431 A | 9/1998 | Bustamante et al. |
| 5,812,296 A | 9/1998 | Tarusawa et al. |
| 5,818,619 A | 10/1998 | Medved et al. |
| 5,818,883 A | 10/1998 | Smith et al. |
| 5,821,510 A | 10/1998 | Cohen et al. |
| 5,825,651 A | 10/1998 | Gupta et al. |
| 5,838,474 A | 11/1998 | Stilling |
| 5,839,052 A | 11/1998 | Dean et al. |
| 5,852,651 A | 12/1998 | Fischer et al. |
| 5,854,986 A | 12/1998 | Dorren et al. |
| 5,859,719 A | 1/1999 | Dentai et al. |
| 5,862,460 A | 1/1999 | Rich |
| 5,867,485 A | 2/1999 | Chambers et al. |
| 5,867,763 A | 2/1999 | Dean et al. |
| 5,875,211 A | 2/1999 | Cooper |
| 5,881,200 A | 3/1999 | Burt |
| 5,883,882 A | 3/1999 | Schwartz |
| 5,896,568 A | 4/1999 | Tseng et al. |
| 5,903,834 A | 5/1999 | Wallstedt et al. |
| 5,910,776 A | 6/1999 | Black |
| 5,913,003 A | 6/1999 | Arroyo et al. |
| 5,917,636 A | 6/1999 | Wake et al. |
| 5,930,682 A | 7/1999 | Schwartz et al. |
| 5,936,754 A | 8/1999 | Ariyavisitakul et al. |
| 5,943,372 A | 8/1999 | Gans et al. |
| 5,946,622 A | 8/1999 | Bojeryd |
| 5,949,564 A | 9/1999 | Wake |
| 5,953,670 A | 9/1999 | Newson |
| 5,959,531 A | 9/1999 | Gallagher, III et al. |
| 5,960,344 A | 9/1999 | Mahany |
| 5,969,837 A | 10/1999 | Farber et al. |
| 5,983,070 A | 11/1999 | Georges et al. |
| 5,987,303 A | 11/1999 | Dutta et al. |
| 6,005,884 A | 12/1999 | Cook et al. |
| 6,006,069 A | 12/1999 | Langston et al. |
| 6,006,105 A | 12/1999 | Rostoker et al. |
| 6,011,980 A | 1/2000 | Nagano et al. |
| 6,014,546 A | 1/2000 | Georges et al. |
| 6,016,426 A | 1/2000 | Bodell |
| 6,023,625 A | 2/2000 | Myers, Jr. |
| 6,037,898 A | 3/2000 | Parish et al. |
| 6,061,161 A | 5/2000 | Yang et al. |
| 6,069,721 A | 5/2000 | Oh et al. |
| 6,088,381 A | 7/2000 | Myers, Jr. |
| 6,118,767 A | 9/2000 | Shen et al. |
| 6,122,529 A | 9/2000 | Sabat, Jr. et al. |
| 6,127,917 A | 10/2000 | Tuttle |
| 6,128,470 A | 10/2000 | Naidu et al. |
| 6,128,477 A | 10/2000 | Freed |
| 6,148,041 A | 11/2000 | Dent |
| 6,150,921 A | 11/2000 | Werb et al. |
| 6,157,810 A | 12/2000 | Georges et al. |
| 6,192,216 B1 | 2/2001 | Sabat, Jr. et al. |
| 6,194,968 B1 | 2/2001 | Winslow |
| 6,212,397 B1 | 4/2001 | Langston et al. |
| 6,222,503 B1 | 4/2001 | Gietema |
| 6,223,201 B1 | 4/2001 | Reznak |
| 6,232,870 B1 | 5/2001 | Garber et al. |
| 6,236,789 B1 | 5/2001 | Fitz |
| 6,236,863 B1 | 5/2001 | Waldroup et al. |
| 6,240,274 B1 | 5/2001 | Izadpanah |
| 6,246,500 B1 | 6/2001 | Ackerman |
| 6,268,946 B1 | 7/2001 | Larkin et al. |
| 6,275,990 B1 | 8/2001 | Dapper et al. |
| 6,279,158 B1 | 8/2001 | Geile et al. |
| 6,286,163 B1 | 9/2001 | Trimble |
| 6,292,673 B1 | 9/2001 | Maeda et al. |
| 6,295,451 B1 | 9/2001 | Mimura |
| 6,301,240 B1 | 10/2001 | Slabinski et al. |
| 6,307,869 B1 | 10/2001 | Pawelski |
| 6,314,163 B1 | 11/2001 | Acampora |
| 6,317,599 B1 | 11/2001 | Rappaport et al. |
| 6,323,980 B1 | 11/2001 | Bloom |
| 6,324,391 B1 | 11/2001 | Bodell |
| 6,330,241 B1 | 12/2001 | Fort |
| 6,330,244 B1 | 12/2001 | Swartz et al. |
| 6,334,219 B1 | 12/2001 | Hill et al. |
| 6,336,021 B1 | 1/2002 | Nukada |
| 6,336,042 B1 | 1/2002 | Dawson et al. |
| 6,337,754 B1 | 1/2002 | Imajo |
| 6,340,932 B1 | 1/2002 | Rodgers et al. |
| 6,353,406 B1 | 3/2002 | Lanzl et al. |

(56) References Cited

U.S. PATENT DOCUMENTS

| | | |
|---|---|---|
| 6,353,600 B1 | 3/2002 | Schwartz et al. |
| 6,359,714 B1 | 3/2002 | Imajo |
| 6,370,203 B1 | 4/2002 | Boesch et al. |
| 6,374,078 B1 | 4/2002 | Williams et al. |
| 6,374,124 B1 | 4/2002 | Slabinski |
| 6,389,010 B1 | 5/2002 | Kubler et al. |
| 6,400,318 B1 | 6/2002 | Kasami et al. |
| 6,400,418 B1 | 6/2002 | Wakabayashi |
| 6,404,775 B1 | 6/2002 | Leslie et al. |
| 6,405,018 B1 | 6/2002 | Reudink et al. |
| 6,405,058 B2 | 6/2002 | Bobier |
| 6,405,308 B1 | 6/2002 | Gupta et al. |
| 6,414,624 B2 | 7/2002 | Endo et al. |
| 6,415,132 B1 | 7/2002 | Sabat, Jr. |
| 6,421,327 B1 | 7/2002 | Lundby et al. |
| 6,438,301 B1 | 8/2002 | Johnson et al. |
| 6,438,371 B1 | 8/2002 | Fujise et al. |
| 6,448,558 B1 | 9/2002 | Greene |
| 6,452,915 B1 | 9/2002 | Jorgensen |
| 6,459,519 B1 | 10/2002 | Sasai et al. |
| 6,459,989 B1 | 10/2002 | Kirkpatrick et al. |
| 6,477,154 B1 | 11/2002 | Cheong et al. |
| 6,480,702 B1 | 11/2002 | Sabat, Jr. |
| 6,486,907 B1 | 11/2002 | Farber et al. |
| 6,496,290 B1 | 12/2002 | Lee |
| 6,501,965 B1 | 12/2002 | Lucidarme |
| 6,504,636 B1 | 1/2003 | Seto et al. |
| 6,504,831 B1 | 1/2003 | Greenwood et al. |
| 6,512,478 B1 | 1/2003 | Chien |
| 6,519,395 B1 | 2/2003 | Bevan et al. |
| 6,519,449 B1 | 2/2003 | Zhang et al. |
| 6,525,855 B1 | 2/2003 | Westbrook et al. |
| 6,535,330 B1 | 3/2003 | Lelic et al. |
| 6,535,720 B1 | 3/2003 | Kintis et al. |
| 6,556,551 B1 | 4/2003 | Schwartz |
| 6,577,794 B1 | 6/2003 | Currie et al. |
| 6,577,801 B2 | 6/2003 | Broderick et al. |
| 6,580,402 B2 | 6/2003 | Navarro et al. |
| 6,580,905 B1 | 6/2003 | Naidu et al. |
| 6,580,918 B1 | 6/2003 | Leickel et al. |
| 6,583,763 B2 | 6/2003 | Judd |
| 6,587,514 B1 | 7/2003 | Wright et al. |
| 6,594,496 B2 | 7/2003 | Schwartz |
| 6,597,325 B2 | 7/2003 | Judd et al. |
| 6,598,009 B2 | 7/2003 | Yang |
| 6,606,430 B2 | 8/2003 | Bartur et al. |
| 6,615,074 B2 | 9/2003 | Mickle et al. |
| 6,628,732 B1 | 9/2003 | Takaki |
| 6,634,811 B1 | 10/2003 | Gertel et al. |
| 6,636,747 B2 | 10/2003 | Harada et al. |
| 6,640,103 B1 | 10/2003 | Inman et al. |
| 6,643,437 B1 | 11/2003 | Park |
| 6,652,158 B2 | 11/2003 | Bartur et al. |
| 6,654,590 B2 | 11/2003 | Boros et al. |
| 6,654,616 B1 | 11/2003 | Pope, Jr. et al. |
| 6,657,535 B1 | 12/2003 | Magbie et al. |
| 6,658,269 B1 | 12/2003 | Golemon et al. |
| 6,665,308 B1 | 12/2003 | Rakib et al. |
| 6,670,930 B2 | 12/2003 | Navarro |
| 6,674,966 B1 | 1/2004 | Koonen |
| 6,675,294 B1 | 1/2004 | Gupta et al. |
| 6,678,509 B2 | 1/2004 | Skarman et al. |
| 6,687,437 B1 | 2/2004 | Starnes et al. |
| 6,690,328 B2 | 2/2004 | Judd |
| 6,701,137 B1 | 3/2004 | Judd et al. |
| 6,704,298 B1 | 3/2004 | Matsumiya et al. |
| 6,704,545 B1 | 3/2004 | Wala |
| 6,710,366 B1 | 3/2004 | Lee et al. |
| 6,714,800 B2 | 3/2004 | Johnson et al. |
| 6,731,880 B2 | 5/2004 | Westbrook et al. |
| 6,745,013 B1 | 6/2004 | Porter et al. |
| 6,758,558 B2 | 7/2004 | Chiu et al. |
| 6,758,913 B1 | 7/2004 | Tunney et al. |
| 6,763,226 B1 | 7/2004 | McZeal, Jr. |
| 6,771,862 B2 | 8/2004 | Karnik et al. |
| 6,771,933 B1 | 8/2004 | Eng et al. |
| 6,784,802 B1 | 8/2004 | Stanescu |
| 6,785,558 B1 | 8/2004 | Stratford et al. |
| 6,788,666 B1 | 9/2004 | Linebarger et al. |
| 6,801,767 B1 | 10/2004 | Schwartz et al. |
| 6,807,374 B1 | 10/2004 | Imajo et al. |
| 6,812,824 B1 | 11/2004 | Goldinger et al. |
| 6,812,905 B2 | 11/2004 | Thomas et al. |
| 6,823,174 B1 | 11/2004 | Masenten et al. |
| 6,826,163 B2 | 11/2004 | Mani et al. |
| 6,826,164 B2 | 11/2004 | Mani et al. |
| 6,826,337 B2 | 11/2004 | Linnell |
| 6,836,660 B1 | 12/2004 | Wala |
| 6,836,673 B1 | 12/2004 | Trott |
| 6,842,433 B2 | 1/2005 | West et al. |
| 6,847,856 B1 | 1/2005 | Bohannon |
| 6,850,510 B2 | 2/2005 | Kubler et al. |
| 6,865,390 B2 | 3/2005 | Goss et al. |
| 6,871,081 B1 | 3/2005 | Llewellyn et al. |
| 6,873,823 B2 | 3/2005 | Hasarchi |
| 6,876,056 B2 | 4/2005 | Tilmans et al. |
| 6,879,290 B1 | 4/2005 | Toutain et al. |
| 6,882,311 B2 | 4/2005 | Walker et al. |
| 6,883,710 B2 | 4/2005 | Chung |
| 6,885,344 B2 | 4/2005 | Mohamadi |
| 6,885,846 B1 | 4/2005 | Panasik et al. |
| 6,889,060 B2 | 5/2005 | Fernando et al. |
| 6,901,061 B1 | 5/2005 | Joo et al. |
| 6,909,399 B1 | 6/2005 | Zegelin et al. |
| 6,915,058 B2 | 7/2005 | Pons |
| 6,915,529 B1 | 7/2005 | Suematsu et al. |
| 6,919,858 B2 | 7/2005 | Rofougaran |
| 6,920,330 B2 | 7/2005 | Caronni et al. |
| 6,924,997 B2 | 8/2005 | Chen et al. |
| 6,930,987 B1 | 8/2005 | Fukuda et al. |
| 6,931,183 B2 | 8/2005 | Panak et al. |
| 6,931,659 B1 | 8/2005 | Kinemura |
| 6,931,813 B2 | 8/2005 | Collie |
| 6,933,849 B2 | 8/2005 | Sawyer |
| 6,934,511 B1 | 8/2005 | Lovinggood et al. |
| 6,934,541 B2 | 8/2005 | Miyatani |
| 6,939,222 B2 | 9/2005 | Grossjohann et al. |
| 6,941,112 B2 | 9/2005 | Hasegawa |
| 6,946,989 B2 | 9/2005 | Vavik |
| 6,961,312 B2 | 11/2005 | Kubler et al. |
| 6,963,289 B2 | 11/2005 | Aljadeff et al. |
| 6,963,552 B2 | 11/2005 | Sabat, Jr. et al. |
| 6,965,718 B2 | 11/2005 | Koertel |
| 6,967,347 B2 | 11/2005 | Estes et al. |
| 6,968,107 B2 | 11/2005 | Belardi et al. |
| 6,970,652 B2 | 11/2005 | Zhang et al. |
| 6,973,243 B2 | 12/2005 | Koyasu et al. |
| 6,974,262 B1 | 12/2005 | Rickenbach |
| 6,977,502 B1 | 12/2005 | Hertz |
| 7,002,511 B1 | 2/2006 | Ammar et al. |
| 7,006,465 B2 | 2/2006 | Toshimitsu et al. |
| 7,013,087 B2 | 3/2006 | Suzuki et al. |
| 7,015,826 B1 | 3/2006 | Chan et al. |
| 7,020,473 B2 | 3/2006 | Splett |
| 7,020,488 B1 | 3/2006 | Bleile et al. |
| 7,024,166 B2 | 4/2006 | Wallace |
| 7,035,512 B2 | 4/2006 | Van Bijsterveld |
| 7,039,399 B2 | 5/2006 | Fischer |
| 7,043,271 B1 | 5/2006 | Seto et al. |
| 7,047,028 B2 | 5/2006 | Cagenius et al. |
| 7,050,017 B2 | 5/2006 | King et al. |
| 7,053,838 B2 | 5/2006 | Judd |
| 7,054,513 B2 | 5/2006 | Herz et al. |
| 7,069,577 B2 | 6/2006 | Geile et al. |
| 7,072,586 B2 | 7/2006 | Aburakawa et al. |
| 7,082,320 B2 | 7/2006 | Kattukaran et al. |
| 7,084,769 B2 | 8/2006 | Bauer et al. |
| 7,093,985 B2 | 8/2006 | Lord et al. |
| 7,103,119 B2 | 9/2006 | Matsuoka et al. |
| 7,103,377 B2 | 9/2006 | Bauman et al. |
| 7,106,252 B2 | 9/2006 | Smith et al. |
| 7,106,931 B2 | 9/2006 | Sutehall et al. |
| 7,110,795 B2 | 9/2006 | Doi |
| 7,114,859 B1 | 10/2006 | Tuohimaa et al. |

(56) References Cited

U.S. PATENT DOCUMENTS

| | | |
|---|---|---|
| 7,127,175 B2 | 10/2006 | Mani et al. |
| 7,127,176 B2 | 10/2006 | Sasaki |
| 7,142,503 B1 | 11/2006 | Grant et al. |
| 7,142,535 B2 | 11/2006 | Kubler et al. |
| 7,142,619 B2 | 11/2006 | Sommer et al. |
| 7,146,506 B1 | 12/2006 | Hannah et al. |
| 7,160,032 B2 | 1/2007 | Nagashima et al. |
| 7,171,244 B2 | 1/2007 | Bauman |
| 7,184,728 B2 | 2/2007 | Solum |
| 7,190,748 B2 | 3/2007 | Kim et al. |
| 7,194,023 B2 | 3/2007 | Norrell et al. |
| 7,199,443 B2 | 4/2007 | Elsharawy |
| 7,200,305 B2 | 4/2007 | Dion et al. |
| 7,200,391 B2 | 4/2007 | Chung et al. |
| 7,228,072 B2 | 6/2007 | Mickelsson et al. |
| 7,254,330 B2 | 8/2007 | Pratt et al. |
| 7,263,293 B2 | 8/2007 | Ommodt et al. |
| 7,269,311 B2 | 9/2007 | Kim et al. |
| 7,280,011 B2 | 10/2007 | Bayar et al. |
| 7,286,843 B2 | 10/2007 | Scheck |
| 7,286,854 B2 | 10/2007 | Ferrato et al. |
| 7,295,119 B2 | 11/2007 | Rappaport et al. |
| 7,310,430 B1 | 12/2007 | Mallya et al. |
| 7,313,415 B2 | 12/2007 | Wake et al. |
| 7,315,735 B2 | 1/2008 | Graham |
| 7,324,730 B2 | 1/2008 | Varkey et al. |
| 7,343,164 B2 | 3/2008 | Kallstenius |
| 7,348,843 B1 | 3/2008 | Qiu et al. |
| 7,349,633 B2 | 3/2008 | Lee et al. |
| 7,359,408 B2 | 4/2008 | Kim |
| 7,359,674 B2 | 4/2008 | Markki et al. |
| 7,366,150 B2 | 4/2008 | Lee et al. |
| 7,366,151 B2 | 4/2008 | Kubler et al. |
| 7,369,526 B2 | 5/2008 | Lechleider et al. |
| 7,379,669 B2 | 5/2008 | Kim |
| 7,388,892 B2 | 6/2008 | Nishiyama et al. |
| 7,392,025 B2 | 6/2008 | Rooyen et al. |
| 7,392,029 B2 | 6/2008 | Pronkine |
| 7,394,883 B2 | 7/2008 | Funakubo et al. |
| 7,403,156 B2 | 7/2008 | Coppi et al. |
| 7,409,159 B2 | 8/2008 | Izadpanah |
| 7,412,224 B2 | 8/2008 | Kotola et al. |
| 7,424,228 B1 | 9/2008 | Williams et al. |
| 7,444,051 B2 | 10/2008 | Tatat et al. |
| 7,450,853 B2 | 11/2008 | Kim et al. |
| 7,450,854 B2 | 11/2008 | Lee et al. |
| 7,451,365 B2 | 11/2008 | Wang et al. |
| 7,454,222 B2 | 11/2008 | Huang et al. |
| 7,460,507 B2 | 12/2008 | Kubler et al. |
| 7,460,829 B2 | 12/2008 | Utsumi et al. |
| 7,460,831 B2 | 12/2008 | Hasarchi |
| 7,466,925 B2 | 12/2008 | Iannelli |
| 7,469,105 B2 | 12/2008 | Wake et al. |
| 7,477,597 B2 | 1/2009 | Segel |
| 7,483,504 B2 | 1/2009 | Shapira et al. |
| 7,483,711 B2 | 1/2009 | Burchfiel |
| 7,495,560 B2 | 2/2009 | Easton et al. |
| 7,496,070 B2 | 2/2009 | Vesuna |
| 7,496,384 B2 | 2/2009 | Seto et al. |
| 7,505,747 B2 | 3/2009 | Solum |
| 7,512,419 B2 | 3/2009 | Solum |
| 7,522,552 B2 | 4/2009 | Fein et al. |
| 7,539,509 B2 | 5/2009 | Bauman et al. |
| 7,542,452 B2 | 6/2009 | Penumetsa |
| 7,546,138 B2 | 6/2009 | Bauman |
| 7,548,138 B2 | 6/2009 | Kamgaing |
| 7,548,695 B2 | 6/2009 | Wake |
| 7,551,641 B2 | 6/2009 | Pirzada et al. |
| 7,557,758 B2 | 7/2009 | Rofougaran |
| 7,565,080 B2 | 7/2009 | Mickelsson et al. |
| 7,580,384 B2 | 8/2009 | Kubler et al. |
| 7,586,861 B2 | 9/2009 | Kubler et al. |
| 7,590,354 B2 | 9/2009 | Sauer et al. |
| 7,593,704 B2 | 9/2009 | Pinel et al. |
| 7,599,420 B2 | 10/2009 | Forenza et al. |
| 7,599,672 B2 | 10/2009 | Shoji et al. |
| 7,610,046 B2 | 10/2009 | Wala |
| 7,627,250 B2 | 12/2009 | George et al. |
| 7,630,690 B2 | 12/2009 | Kaewell, Jr. et al. |
| 7,633,934 B2 | 12/2009 | Kubler et al. |
| 7,639,982 B2 | 12/2009 | Wala |
| 7,646,743 B2 | 1/2010 | Kubler et al. |
| 7,646,777 B2 | 1/2010 | Hicks, III et al. |
| 7,653,397 B2 | 1/2010 | Pernu et al. |
| 7,668,565 B2 | 2/2010 | Ylänen et al. |
| 7,672,591 B2 | 3/2010 | Soto et al. |
| 7,675,936 B2 | 3/2010 | Mizutani et al. |
| 7,688,811 B2 | 3/2010 | Kubler et al. |
| 7,693,486 B2 | 4/2010 | Kasslin et al. |
| 7,697,467 B2 | 4/2010 | Kubler et al. |
| 7,697,574 B2 | 4/2010 | Suematsu et al. |
| 7,715,375 B2 | 5/2010 | Kubler et al. |
| 7,720,510 B2 | 5/2010 | Pescod et al. |
| 7,751,374 B2 | 7/2010 | Donovan |
| 7,751,838 B2 | 7/2010 | Ramesh et al. |
| 7,760,703 B2 | 7/2010 | Kubler et al. |
| 7,761,093 B2 | 7/2010 | Sabat, Jr. et al. |
| 7,768,951 B2 | 8/2010 | Kubler et al. |
| 7,773,573 B2 | 8/2010 | Chung et al. |
| 7,778,603 B2 | 8/2010 | Palin et al. |
| 7,787,823 B2 | 8/2010 | George et al. |
| 7,805,073 B2 | 9/2010 | Sabat, Jr. et al. |
| 7,809,012 B2 | 10/2010 | Ruuska et al. |
| 7,812,766 B2 | 10/2010 | Leblanc et al. |
| 7,812,775 B2 | 10/2010 | Babakhani et al. |
| 7,817,969 B2 | 10/2010 | Castaneda et al. |
| 7,835,328 B2 | 11/2010 | Stephens et al. |
| 7,848,316 B2 | 12/2010 | Kubler et al. |
| 7,848,770 B2 | 12/2010 | Scheinert |
| 7,853,234 B2 | 12/2010 | Afsahi |
| 7,870,321 B2 | 1/2011 | Rofougaran |
| 7,880,677 B2 | 2/2011 | Rofougaran et al. |
| 7,881,755 B1 | 2/2011 | Mishra et al. |
| 7,894,423 B2 | 2/2011 | Kubler et al. |
| 7,899,007 B2 | 3/2011 | Kubler et al. |
| 7,907,972 B2 | 3/2011 | Walton et al. |
| 7,912,043 B2 | 3/2011 | Kubler et al. |
| 7,912,506 B2 | 3/2011 | Lovberg et al. |
| 7,916,706 B2 | 3/2011 | Kubler et al. |
| 7,917,177 B2 | 3/2011 | Bauman |
| 7,920,553 B2 | 4/2011 | Kubler et al. |
| 7,920,858 B2 | 4/2011 | Sabat, Jr. et al. |
| 7,924,783 B1 | 4/2011 | Mahany et al. |
| 7,936,713 B2 | 5/2011 | Kubler et al. |
| 7,949,364 B2 | 5/2011 | Kasslin et al. |
| 7,957,777 B1 | 6/2011 | Vu et al. |
| 7,962,111 B2 | 6/2011 | Solum |
| 7,969,009 B2 | 6/2011 | Chandrasekaran |
| 7,969,911 B2 | 6/2011 | Mahany et al. |
| 7,990,925 B2 | 8/2011 | Tinnakornsrisuphap et al. |
| 7,996,020 B1 | 8/2011 | Chhabra |
| 8,018,907 B2 | 9/2011 | Kubler et al. |
| 8,023,886 B2 | 9/2011 | Rofougaran |
| 8,027,656 B2 | 9/2011 | Rofougaran et al. |
| 8,036,308 B2 | 10/2011 | Rofougaran |
| 8,073,329 B2 | 12/2011 | Gao et al. |
| 8,082,353 B2 | 12/2011 | Huber et al. |
| 8,086,192 B2 | 12/2011 | Rofougaran et al. |
| 8,107,815 B2 | 1/2012 | Akasaka et al. |
| 8,135,102 B2 | 3/2012 | Wiwel et al. |
| 8,155,525 B2 | 4/2012 | Cox |
| 8,213,401 B2 | 7/2012 | Fischer et al. |
| 8,223,795 B2 | 7/2012 | Cox et al. |
| 8,228,849 B2 | 7/2012 | Trachewsky |
| 8,238,463 B1 | 8/2012 | Arslan et al. |
| 8,270,387 B2 | 9/2012 | Cannon et al. |
| 8,275,262 B2 | 9/2012 | Cui et al. |
| 8,280,250 B2 | 10/2012 | Brodsky et al. |
| 8,280,259 B2 | 10/2012 | George et al. |
| 8,290,483 B2 | 10/2012 | Sabat, Jr. et al. |
| 8,306,563 B2 | 11/2012 | Zavadsky et al. |
| 8,346,278 B2 | 1/2013 | Wala et al. |
| 8,351,792 B2 | 1/2013 | Zheng |
| 8,374,508 B2 | 2/2013 | Soto et al. |

(56) References Cited

U.S. PATENT DOCUMENTS

| | | | |
|---|---|---|---|
| 8,391,256 B2 | 3/2013 | Beach | |
| 8,422,883 B2 | 4/2013 | Yeh et al. | |
| 8,428,510 B2 | 4/2013 | Stratford et al. | |
| 8,452,178 B2 | 5/2013 | Gao et al. | |
| 8,462,683 B2 | 6/2013 | Uyehara et al. | |
| 8,472,409 B2 | 6/2013 | Sun et al. | |
| 8,472,579 B2 | 6/2013 | Uyehara et al. | |
| 8,488,966 B2 | 7/2013 | Zheng | |
| 8,509,215 B2 | 8/2013 | Stuart | |
| 8,509,850 B2 | 8/2013 | Zavadsky et al. | |
| 8,526,970 B2 | 9/2013 | Wala et al. | |
| 8,532,242 B2 | 9/2013 | Fischer et al. | |
| 8,548,330 B2 * | 10/2013 | Berlin | H04B 10/25753 340/2.22 |
| 8,626,245 B2 | 1/2014 | Zavadsky et al. | |
| 8,639,121 B2 | 1/2014 | George et al. | |
| 8,649,684 B2 | 2/2014 | Casterline et al. | |
| 8,676,214 B2 | 3/2014 | Fischer et al. | |
| 8,737,454 B2 | 5/2014 | Wala et al. | |
| 8,743,718 B2 | 6/2014 | Grenier et al. | |
| 8,743,756 B2 | 6/2014 | Uyehara et al. | |
| 8,780,743 B2 * | 7/2014 | Sombrutzki | H04W 16/10 370/252 |
| 8,792,933 B2 * | 7/2014 | Chen | H04B 7/022 370/254 |
| 8,837,659 B2 | 9/2014 | Uyehara et al. | |
| 8,837,940 B2 | 9/2014 | Smith et al. | |
| 8,873,585 B2 | 10/2014 | Oren et al. | |
| 8,929,288 B2 | 1/2015 | Stewart et al. | |
| 9,107,086 B2 | 8/2015 | Leimeister et al. | |
| 9,112,547 B2 | 8/2015 | Scheinert et al. | |
| 9,525,488 B2 | 12/2016 | Beamon et al. | |
| 2001/0036163 A1 | 11/2001 | Sabat, Jr. et al. | |
| 2001/0036199 A1 | 11/2001 | Terry | |
| 2002/0003645 A1 | 1/2002 | Kim et al. | |
| 2002/0009070 A1 | 1/2002 | Lindsay et al. | |
| 2002/0012336 A1 | 1/2002 | Hughes et al. | |
| 2002/0012495 A1 | 1/2002 | Sasai et al. | |
| 2002/0016827 A1 | 2/2002 | McCabe et al. | |
| 2002/0045518 A1 | 4/2002 | Dalebout et al. | |
| 2002/0045519 A1 | 4/2002 | Watterson et al. | |
| 2002/0048071 A1 | 4/2002 | Suzuki et al. | |
| 2002/0051434 A1 | 5/2002 | Ozluturk et al. | |
| 2002/0061763 A1 | 5/2002 | Weissman | |
| 2002/0075906 A1 | 6/2002 | Cole et al. | |
| 2002/0092347 A1 | 7/2002 | Niekerk et al. | |
| 2002/0097564 A1 | 7/2002 | Struhsaker et al. | |
| 2002/0103012 A1 | 8/2002 | Kim et al. | |
| 2002/0111149 A1 | 8/2002 | Shoki | |
| 2002/0111192 A1 | 8/2002 | Thomas et al. | |
| 2002/0114038 A1 | 8/2002 | Arnon et al. | |
| 2002/0123365 A1 | 9/2002 | Thorson et al. | |
| 2002/0126967 A1 | 9/2002 | Panak et al. | |
| 2002/0128009 A1 | 9/2002 | Boch et al. | |
| 2002/0130778 A1 | 9/2002 | Nicholson | |
| 2002/0139064 A1 | 10/2002 | Norwood | |
| 2002/0181668 A1 | 12/2002 | Masoian et al. | |
| 2002/0190845 A1 | 12/2002 | Moore | |
| 2002/0197984 A1 | 12/2002 | Monin et al. | |
| 2003/0002604 A1 | 1/2003 | Fifield et al. | |
| 2003/0007214 A1 | 1/2003 | Aburakawa et al. | |
| 2003/0016418 A1 | 1/2003 | Westbrook et al. | |
| 2003/0045284 A1 | 3/2003 | Copley et al. | |
| 2003/0069922 A1 | 4/2003 | Arunachalam | |
| 2003/0078074 A1 | 4/2003 | Sesay et al. | |
| 2003/0112826 A1 | 6/2003 | Ashwood Smith et al. | |
| 2003/0126294 A1 | 7/2003 | Thorsteinson et al. | |
| 2003/0141962 A1 | 7/2003 | Barink | |
| 2003/0161637 A1 | 8/2003 | Yamamoto et al. | |
| 2003/0165287 A1 | 9/2003 | Krill et al. | |
| 2003/0174099 A1 | 9/2003 | Bauer et al. | |
| 2003/0209601 A1 | 11/2003 | Chung | |
| 2004/0001719 A1 | 1/2004 | Sasaki | |
| 2004/0008114 A1 | 1/2004 | Sawyer | |
| 2004/0017785 A1 | 1/2004 | Zelst | |
| 2004/0037565 A1 | 2/2004 | Young et al. | |
| 2004/0041714 A1 | 3/2004 | Forster | |
| 2004/0043764 A1 | 3/2004 | Bigham et al. | |
| 2004/0047313 A1 | 3/2004 | Rumpf et al. | |
| 2004/0078151 A1 | 4/2004 | Aljadeff et al. | |
| 2004/0095907 A1 | 5/2004 | Agee et al. | |
| 2004/0100930 A1 | 5/2004 | Shapira et al. | |
| 2004/0106435 A1 | 6/2004 | Bauman et al. | |
| 2004/0126068 A1 | 7/2004 | Van Bijsterveld | |
| 2004/0126107 A1 | 7/2004 | Jay et al. | |
| 2004/0139477 A1 | 7/2004 | Russell et al. | |
| 2004/0146020 A1 | 7/2004 | Kubler et al. | |
| 2004/0149736 A1 | 8/2004 | Clothier | |
| 2004/0151164 A1 | 8/2004 | Kubler et al. | |
| 2004/0151503 A1 | 8/2004 | Kashima et al. | |
| 2004/0157623 A1 | 8/2004 | Splett | |
| 2004/0160912 A1 | 8/2004 | Kubler et al. | |
| 2004/0160913 A1 | 8/2004 | Kubler et al. | |
| 2004/0162084 A1 | 8/2004 | Wang | |
| 2004/0162115 A1 | 8/2004 | Smith et al. | |
| 2004/0162116 A1 | 8/2004 | Han et al. | |
| 2004/0165573 A1 | 8/2004 | Kubler et al. | |
| 2004/0175173 A1 | 9/2004 | Deas | |
| 2004/0196404 A1 | 10/2004 | Loheit et al. | |
| 2004/0202257 A1 | 10/2004 | Mehta et al. | |
| 2004/0203703 A1 | 10/2004 | Fischer | |
| 2004/0203704 A1 | 10/2004 | Ommodt et al. | |
| 2004/0203846 A1 | 10/2004 | Caronni et al. | |
| 2004/0204109 A1 | 10/2004 | Hoppenstein | |
| 2004/0208526 A1 | 10/2004 | Mibu | |
| 2004/0208643 A1 | 10/2004 | Roberts et al. | |
| 2004/0215723 A1 | 10/2004 | Chadha | |
| 2004/0218873 A1 | 11/2004 | Nagashima et al. | |
| 2004/0233877 A1 | 11/2004 | Lee et al. | |
| 2004/0240884 A1 | 12/2004 | Gumaste et al. | |
| 2004/0258105 A1 | 12/2004 | Spathas et al. | |
| 2004/0267971 A1 | 12/2004 | Seshadri | |
| 2005/0013612 A1 | 1/2005 | Yap | |
| 2005/0052287 A1 | 3/2005 | Whitesmith et al. | |
| 2005/0058451 A1 | 3/2005 | Ross | |
| 2005/0058455 A1 | 3/2005 | Aronson et al. | |
| 2005/0068179 A1 | 3/2005 | Roesner | |
| 2005/0076982 A1 | 4/2005 | Metcalf et al. | |
| 2005/0078006 A1 | 4/2005 | Hutchins et al. | |
| 2005/0093679 A1 | 5/2005 | Zai et al. | |
| 2005/0099343 A1 | 5/2005 | Asrani et al. | |
| 2005/0116821 A1 | 6/2005 | Wilsey et al. | |
| 2005/0123232 A1 | 6/2005 | Piede et al. | |
| 2005/0141545 A1 | 6/2005 | Fein et al. | |
| 2005/0143077 A1 | 6/2005 | Charbonneau | |
| 2005/0147067 A1 | 7/2005 | Mani et al. | |
| 2005/0147071 A1 | 7/2005 | Karaoguz et al. | |
| 2005/0148306 A1 | 7/2005 | Hiddink | |
| 2005/0159108 A1 | 7/2005 | Fletcher | |
| 2005/0174236 A1 | 8/2005 | Brookner | |
| 2005/0176458 A1 | 8/2005 | Shklarsky et al. | |
| 2005/0201323 A1 | 9/2005 | Mani et al. | |
| 2005/0201761 A1 | 9/2005 | Bartur et al. | |
| 2005/0219050 A1 | 10/2005 | Martin | |
| 2005/0224585 A1 | 10/2005 | Durrant et al. | |
| 2005/0226625 A1 | 10/2005 | Wake et al. | |
| 2005/0232636 A1 | 10/2005 | Durrant et al. | |
| 2005/0242188 A1 | 11/2005 | Vesuna | |
| 2005/0252971 A1 | 11/2005 | Howarth et al. | |
| 2005/0266797 A1 | 12/2005 | Utsumi et al. | |
| 2005/0266854 A1 | 12/2005 | Niiho et al. | |
| 2005/0269930 A1 | 12/2005 | Shimizu et al. | |
| 2005/0271396 A1 | 12/2005 | Iannelli | |
| 2005/0272439 A1 | 12/2005 | Picciriello et al. | |
| 2006/0002326 A1 | 1/2006 | Vesuna | |
| 2006/0014548 A1 | 1/2006 | Bolin | |
| 2006/0017633 A1 | 1/2006 | Pronkine | |
| 2006/0028352 A1 | 2/2006 | McNamara et al. | |
| 2006/0045054 A1 | 3/2006 | Utsumi et al. | |
| 2006/0045524 A1 | 3/2006 | Lee et al. | |
| 2006/0045525 A1 | 3/2006 | Lee et al. | |
| 2006/0053324 A1 | 3/2006 | Giat et al. | |
| 2006/0056327 A1 | 3/2006 | Coersmeier | |
| 2006/0062579 A1 | 3/2006 | Kim et al. | |

(56) References Cited

U.S. PATENT DOCUMENTS

| | | |
|---|---|---|
| 2006/0083512 A1 | 4/2006 | Wake |
| 2006/0083520 A1 | 4/2006 | Healey et al. |
| 2006/0094470 A1 | 5/2006 | Wake et al. |
| 2006/0104643 A1 | 5/2006 | Lee et al. |
| 2006/0146755 A1 | 7/2006 | Pan et al. |
| 2006/0159388 A1 | 7/2006 | Kawase et al. |
| 2006/0172775 A1 | 8/2006 | Conyers et al. |
| 2006/0182446 A1 | 8/2006 | Kim et al. |
| 2006/0182449 A1 | 8/2006 | Iannelli et al. |
| 2006/0189354 A1 | 8/2006 | Lee et al. |
| 2006/0209745 A1 | 9/2006 | MacMullan et al. |
| 2006/0223439 A1 | 10/2006 | Pinel et al. |
| 2006/0233506 A1 | 10/2006 | Noonan et al. |
| 2006/0239630 A1 | 10/2006 | Hase et al. |
| 2006/0268738 A1 | 11/2006 | Goerke et al. |
| 2006/0274704 A1 | 12/2006 | Desai et al. |
| 2007/0009266 A1 | 1/2007 | Bothwell |
| 2007/0050451 A1 | 3/2007 | Caspi et al. |
| 2007/0054682 A1 | 3/2007 | Fanning et al. |
| 2007/0058978 A1 | 3/2007 | Lee et al. |
| 2007/0060045 A1 | 3/2007 | Prautzsch |
| 2007/0060055 A1 | 3/2007 | Desai et al. |
| 2007/0071128 A1 | 3/2007 | Meir et al. |
| 2007/0076649 A1 | 4/2007 | Lin et al. |
| 2007/0093273 A1 | 4/2007 | Cai |
| 2007/0149250 A1 | 6/2007 | Crozzoli et al. |
| 2007/0166042 A1 | 7/2007 | Seeds et al. |
| 2007/0173288 A1 | 7/2007 | Skarby et al. |
| 2007/0174889 A1 | 7/2007 | Kim et al. |
| 2007/0224954 A1 | 9/2007 | Gopi |
| 2007/0230328 A1 | 10/2007 | Saitou |
| 2007/0243899 A1 | 10/2007 | Hermel et al. |
| 2007/0248358 A1 | 10/2007 | Sauer |
| 2007/0253714 A1 | 11/2007 | Seeds et al. |
| 2007/0257796 A1 | 11/2007 | Easton et al. |
| 2007/0264009 A1 | 11/2007 | Sabat, Jr. et al. |
| 2007/0264011 A1 | 11/2007 | Sone et al. |
| 2007/0268846 A1 | 11/2007 | Proctor et al. |
| 2007/0274279 A1 | 11/2007 | Wood et al. |
| 2007/0280370 A1 | 12/2007 | Liu |
| 2007/0286599 A1 | 12/2007 | Sauer et al. |
| 2007/0292143 A1 | 12/2007 | Yu et al. |
| 2007/0297005 A1 | 12/2007 | Montierth et al. |
| 2008/0002652 A1 | 1/2008 | Gupta et al. |
| 2008/0007453 A1 | 1/2008 | Vassilakis et al. |
| 2008/0013909 A1 | 1/2008 | Kostet et al. |
| 2008/0013956 A1 | 1/2008 | Ware et al. |
| 2008/0013957 A1 | 1/2008 | Akers et al. |
| 2008/0014948 A1 | 1/2008 | Scheinert |
| 2008/0014992 A1 | 1/2008 | Pescod et al. |
| 2008/0026765 A1 | 1/2008 | Charbonneau |
| 2008/0031628 A1 | 2/2008 | Dragas et al. |
| 2008/0043714 A1 | 2/2008 | Pernu |
| 2008/0056167 A1 | 3/2008 | Kim et al. |
| 2008/0058018 A1 | 3/2008 | Scheinert |
| 2008/0063397 A1 | 3/2008 | Hu et al. |
| 2008/0070502 A1 | 3/2008 | George et al. |
| 2008/0080863 A1 | 4/2008 | Sauer et al. |
| 2008/0098203 A1 | 4/2008 | Master et al. |
| 2008/0118014 A1 | 5/2008 | Reunamaki et al. |
| 2008/0119198 A1 | 5/2008 | Hettstedt et al. |
| 2008/0124086 A1 | 5/2008 | Matthews |
| 2008/0124087 A1 | 5/2008 | Hartmann et al. |
| 2008/0129634 A1 | 6/2008 | Pera et al. |
| 2008/0134194 A1 | 6/2008 | Liu |
| 2008/0145061 A1 | 6/2008 | Lee et al. |
| 2008/0150514 A1 | 6/2008 | Codreanu et al. |
| 2008/0159744 A1 | 7/2008 | Soto et al. |
| 2008/0166094 A1 | 7/2008 | Bookbinder et al. |
| 2008/0191682 A1 | 8/2008 | Cook |
| 2008/0194226 A1 | 8/2008 | Rivas et al. |
| 2008/0207253 A1 | 8/2008 | Jaakkola et al. |
| 2008/0212969 A1 | 9/2008 | Fasshauer et al. |
| 2008/0219670 A1 | 9/2008 | Kim et al. |
| 2008/0232305 A1 | 9/2008 | Oren et al. |
| 2008/0232799 A1 | 9/2008 | Kim |
| 2008/0247716 A1 | 10/2008 | Thomas |
| 2008/0253280 A1 | 10/2008 | Tang et al. |
| 2008/0253351 A1 | 10/2008 | Pernu et al. |
| 2008/0253773 A1 | 10/2008 | Zheng |
| 2008/0260388 A1 | 10/2008 | Kim et al. |
| 2008/0260389 A1 | 10/2008 | Zheng |
| 2008/0261656 A1 | 10/2008 | Bella et al. |
| 2008/0268766 A1 | 10/2008 | Narkmon et al. |
| 2008/0268833 A1 | 10/2008 | Huang et al. |
| 2008/0273844 A1 | 11/2008 | Kewitsch |
| 2008/0279137 A1 | 11/2008 | Pernu et al. |
| 2008/0280569 A1 | 11/2008 | Hazani et al. |
| 2008/0291830 A1 | 11/2008 | Pernu et al. |
| 2008/0292322 A1 | 11/2008 | Daghighian et al. |
| 2008/0298813 A1 | 12/2008 | Song et al. |
| 2008/0304831 A1 | 12/2008 | Miller, II et al. |
| 2008/0310464 A1 | 12/2008 | Schneider |
| 2008/0310848 A1 | 12/2008 | Yasuda et al. |
| 2008/0311876 A1 | 12/2008 | Leenaerts et al. |
| 2008/0311944 A1 | 12/2008 | Hansen et al. |
| 2009/0022304 A1 | 1/2009 | Kubler et al. |
| 2009/0028087 A1 | 1/2009 | Nguyen et al. |
| 2009/0028317 A1 | 1/2009 | Ling et al. |
| 2009/0041413 A1 | 2/2009 | Hurley |
| 2009/0047023 A1 | 2/2009 | Pescod et al. |
| 2009/0059903 A1 | 3/2009 | Kubler et al. |
| 2009/0061796 A1 | 3/2009 | Arkko et al. |
| 2009/0061939 A1 | 3/2009 | Andersson et al. |
| 2009/0073916 A1 | 3/2009 | Zhang et al. |
| 2009/0081985 A1 | 3/2009 | Rofougaran et al. |
| 2009/0087179 A1 | 4/2009 | Underwood et al. |
| 2009/0088071 A1 | 4/2009 | Rofougaran |
| 2009/0088072 A1 | 4/2009 | Rofougaran et al. |
| 2009/0097855 A1 | 4/2009 | Thelen et al. |
| 2009/0135078 A1 | 5/2009 | Lindmark et al. |
| 2009/0141780 A1 | 6/2009 | Cruz-Albrecht et al. |
| 2009/0149221 A1 | 6/2009 | Liu et al. |
| 2009/0154621 A1 | 6/2009 | Shapira et al. |
| 2009/0169163 A1 | 7/2009 | Abbott, III et al. |
| 2009/0175214 A1 | 7/2009 | Sfar et al. |
| 2009/0180407 A1 | 7/2009 | Sabat et al. |
| 2009/0180426 A1 | 7/2009 | Sabat et al. |
| 2009/0218407 A1 | 9/2009 | Rofougaran |
| 2009/0218657 A1 | 9/2009 | Rofougaran |
| 2009/0237317 A1 | 9/2009 | Rofougaran |
| 2009/0245084 A1 | 10/2009 | Moffatt et al. |
| 2009/0245153 A1 | 10/2009 | Li et al. |
| 2009/0245221 A1 | 10/2009 | Piipponen |
| 2009/0247109 A1 | 10/2009 | Rofougaran |
| 2009/0252136 A1 | 10/2009 | Mahany et al. |
| 2009/0252139 A1 | 10/2009 | Ludovico et al. |
| 2009/0252205 A1 | 10/2009 | Rheinfelder et al. |
| 2009/0258652 A1 | 10/2009 | Lambert et al. |
| 2009/0278596 A1 | 11/2009 | Rofougaran et al. |
| 2009/0279593 A1 | 11/2009 | Rofougaran et al. |
| 2009/0285147 A1 | 11/2009 | Subasic et al. |
| 2009/0316608 A1 | 12/2009 | Singh et al. |
| 2009/0316609 A1 | 12/2009 | Singh |
| 2009/0319909 A1 | 12/2009 | Hsueh et al. |
| 2010/0002626 A1 | 1/2010 | Schmidt et al. |
| 2010/0002661 A1 | 1/2010 | Schmidt et al. |
| 2010/0002662 A1 | 1/2010 | Schmidt et al. |
| 2010/0014494 A1 | 1/2010 | Schmidt et al. |
| 2010/0014868 A1 | 1/2010 | McGlynn et al. |
| 2010/0027443 A1 | 2/2010 | LoGalbo et al. |
| 2010/0054746 A1 | 3/2010 | Logan |
| 2010/0056200 A1 | 3/2010 | Tolonen |
| 2010/0080154 A1 | 4/2010 | Noh et al. |
| 2010/0080182 A1 | 4/2010 | Kubler et al. |
| 2010/0091475 A1 | 4/2010 | Toms et al. |
| 2010/0093391 A1* | 4/2010 | Saban ............ H04B 7/024 455/552.1 |
| 2010/0099451 A1 | 4/2010 | Saban et al. |
| 2010/0118864 A1 | 5/2010 | Kubler et al. |
| 2010/0127937 A1 | 5/2010 | Chandrasekaran et al. |
| 2010/0134257 A1 | 6/2010 | Puleston et al. |
| 2010/0142598 A1 | 6/2010 | Murray et al. |
| 2010/0142955 A1 | 6/2010 | Yu et al. |

(56) References Cited

U.S. PATENT DOCUMENTS

| | | |
|---|---|---|
| 2010/0144285 A1 | 6/2010 | Behzad et al. |
| 2010/0148373 A1 | 6/2010 | Chandrasekaran |
| 2010/0150556 A1 | 6/2010 | Soto et al. |
| 2010/0156721 A1 | 6/2010 | Alamouti et al. |
| 2010/0158525 A1 | 6/2010 | Walter |
| 2010/0159859 A1 | 6/2010 | Rofougaran |
| 2010/0188998 A1 | 7/2010 | Pernu et al. |
| 2010/0189439 A1 | 7/2010 | Novak et al. |
| 2010/0190509 A1 | 7/2010 | Davis |
| 2010/0202326 A1 | 8/2010 | Rofougaran et al. |
| 2010/0208656 A1 | 8/2010 | Oh |
| 2010/0225413 A1 | 9/2010 | Rofougaran et al. |
| 2010/0225520 A1 | 9/2010 | Mohamadi et al. |
| 2010/0225556 A1 | 9/2010 | Rofougaran et al. |
| 2010/0225557 A1 | 9/2010 | Rofougaran et al. |
| 2010/0232323 A1 | 9/2010 | Kubler et al. |
| 2010/0246558 A1 | 9/2010 | Harel |
| 2010/0255774 A1 | 10/2010 | Kenington |
| 2010/0258949 A1 | 10/2010 | Henderson et al. |
| 2010/0260063 A1 | 10/2010 | Kubler et al. |
| 2010/0261501 A1 | 10/2010 | Behzad et al. |
| 2010/0266287 A1 | 10/2010 | Adhikari et al. |
| 2010/0278530 A1 | 11/2010 | Kummetz et al. |
| 2010/0284323 A1 | 11/2010 | Tang et al. |
| 2010/0290355 A1 | 11/2010 | Roy et al. |
| 2010/0309049 A1 | 12/2010 | Reunamäki et al. |
| 2010/0309752 A1 | 12/2010 | Lee et al. |
| 2010/0311472 A1 | 12/2010 | Rofougaran et al. |
| 2010/0311480 A1 | 12/2010 | Raines et al. |
| 2010/0329161 A1 | 12/2010 | Ylanen et al. |
| 2010/0329166 A1 | 12/2010 | Mahany et al. |
| 2010/0329680 A1 | 12/2010 | Presi et al. |
| 2011/0002687 A1 | 1/2011 | Sabat, Jr. et al. |
| 2011/0007724 A1 | 1/2011 | Mahany et al. |
| 2011/0007733 A1 | 1/2011 | Kubler et al. |
| 2011/0008042 A1 | 1/2011 | Stewart |
| 2011/0019999 A1 | 1/2011 | George et al. |
| 2011/0021146 A1 | 1/2011 | Pernu |
| 2011/0021224 A1 | 1/2011 | Koskinen et al. |
| 2011/0026932 A1 | 2/2011 | Yeh et al. |
| 2011/0028161 A1 | 2/2011 | Larsen |
| 2011/0045767 A1 | 2/2011 | Rofougaran et al. |
| 2011/0055875 A1 | 3/2011 | Zussman |
| 2011/0065450 A1 | 3/2011 | Kazmi |
| 2011/0066774 A1 | 3/2011 | Rofougaran |
| 2011/0069668 A1 | 3/2011 | Chion et al. |
| 2011/0071734 A1 | 3/2011 | Van Wiemeersch et al. |
| 2011/0083152 A1 | 4/2011 | Centore, III et al. |
| 2011/0086614 A1 | 4/2011 | Brisebois et al. |
| 2011/0116393 A1 | 5/2011 | Hong et al. |
| 2011/0116572 A1 | 5/2011 | Lee et al. |
| 2011/0116794 A1 | 5/2011 | George et al. |
| 2011/0122912 A1 | 5/2011 | Benjamin et al. |
| 2011/0126071 A1 | 5/2011 | Han et al. |
| 2011/0149879 A1 | 6/2011 | Noriega et al. |
| 2011/0158298 A1 | 6/2011 | Djadi et al. |
| 2011/0182230 A1 | 7/2011 | Ohm et al. |
| 2011/0194475 A1 | 8/2011 | Kim et al. |
| 2011/0200328 A1 | 8/2011 | In De Betou et al. |
| 2011/0201368 A1 | 8/2011 | Faccin et al. |
| 2011/0204504 A1 | 8/2011 | Henderson et al. |
| 2011/0206383 A1 | 8/2011 | Chien et al. |
| 2011/0211439 A1 | 9/2011 | Manpuria et al. |
| 2011/0215901 A1 | 9/2011 | Van Wiemeersch et al. |
| 2011/0222415 A1 | 9/2011 | Ramamurthi et al. |
| 2011/0222434 A1* | 9/2011 | Chen ........ H04B 7/022 370/254 |
| 2011/0222619 A1 | 9/2011 | Ramamurthi et al. |
| 2011/0223958 A1* | 9/2011 | Chen ........ H04B 7/022 455/522 |
| 2011/0223961 A1* | 9/2011 | Chen ........ H04B 7/022 455/522 |
| 2011/0227795 A1 | 9/2011 | Lopez et al. |
| 2011/0244887 A1 | 10/2011 | Dupray et al. |
| 2011/0244914 A1* | 10/2011 | Venkatraman ........ H04W 52/40 455/522 |
| 2011/0256878 A1 | 10/2011 | Zhu et al. |
| 2011/0268033 A1 | 11/2011 | Boldi et al. |
| 2011/0268446 A1 | 11/2011 | Cune et al. |
| 2011/0268449 A1 | 11/2011 | Berlin et al. |
| 2011/0274021 A1 | 11/2011 | He et al. |
| 2011/0281536 A1 | 11/2011 | Lee et al. |
| 2011/0312340 A1 | 12/2011 | Wu et al. |
| 2012/0069880 A1 | 3/2012 | Lemson et al. |
| 2012/0134673 A1 | 5/2012 | Palanisamy et al. |
| 2012/0177026 A1 | 7/2012 | Uyehara et al. |
| 2012/0196611 A1* | 8/2012 | Venkatraman ...... H04W 52/143 455/450 |
| 2012/0208581 A1* | 8/2012 | Ishida .................. H04B 7/0691 455/509 |
| 2012/0230695 A1 | 9/2012 | O'Krafka et al. |
| 2012/0257893 A1 | 10/2012 | Boyd et al. |
| 2012/0281565 A1 | 11/2012 | Sauer |
| 2012/0294208 A1* | 11/2012 | Rofougaran ............ H01L 23/66 370/280 |
| 2012/0314665 A1 | 12/2012 | Ishida et al. |
| 2012/0321305 A1 | 12/2012 | George et al. |
| 2013/0012195 A1 | 1/2013 | Sabat, Jr. et al. |
| 2013/0053050 A1* | 2/2013 | Kang .................... H04B 7/022 455/452.1 |
| 2013/0077580 A1* | 3/2013 | Kang .................... H04B 7/061 370/329 |
| 2013/0089332 A1 | 4/2013 | Sauer et al. |
| 2013/0094439 A1* | 4/2013 | Moshfeghi ............ H04W 88/06 370/328 |
| 2013/0095871 A1* | 4/2013 | Soriaga ................ H04B 7/0691 455/503 |
| 2013/0095873 A1* | 4/2013 | Soriaga .................. H04B 7/024 455/509 |
| 2013/0142054 A1* | 6/2013 | Ahmadi ................. H04B 7/024 370/252 |
| 2013/0195467 A1 | 8/2013 | Schmid et al. |
| 2013/0210490 A1 | 8/2013 | Fischer et al. |
| 2013/0236180 A1 | 9/2013 | Kim et al. |
| 2013/0249292 A1 | 9/2013 | Blackwell, Jr. et al. |
| 2014/0016583 A1 | 1/2014 | Smith |
| 2014/0072064 A1 | 3/2014 | Lemson et al. |
| 2014/0086082 A1* | 3/2014 | Kim ..................... H04B 17/345 370/252 |
| 2014/0113671 A1* | 4/2014 | Schwengler .......... H04W 16/00 455/517 |
| 2014/0118464 A1 | 5/2014 | George et al. |
| 2014/0119735 A1* | 5/2014 | Cune .................... H04W 16/26 398/115 |
| 2014/0140225 A1 | 5/2014 | Wala |
| 2014/0146797 A1 | 5/2014 | Zavadsky et al. |
| 2014/0146905 A1 | 5/2014 | Zavadsky et al. |
| 2014/0146906 A1 | 5/2014 | Zavadsky et al. |
| 2014/0153919 A1 | 6/2014 | Casterline et al. |
| 2014/0162664 A1* | 6/2014 | Stapleton ............... H04W 24/02 455/445 |
| 2014/0194135 A1* | 7/2014 | Terry .................... H04W 24/02 455/452.2 |
| 2014/0219140 A1 | 8/2014 | Uyehara et al. |
| 2014/0233435 A1 | 8/2014 | Ko |
| 2014/0243033 A1 | 8/2014 | Wala et al. |
| 2014/0274184 A1* | 9/2014 | Regan .................. H04W 48/16 455/515 |
| 2015/0037041 A1 | 2/2015 | Cune et al. |
| 2016/0270032 A1* | 9/2016 | Guevin .................. H04W 72/04 |
| 2016/0309340 A1 | 10/2016 | Malach |

FOREIGN PATENT DOCUMENTS

| | | |
|---|---|---|
| CA | 2065090 C | 2/1998 |
| CA | 2242707 A1 | 1/1999 |
| CN | 1207841 A | 2/1999 |
| CN | 1230311 A | 9/1999 |
| CN | 1980088 A | 6/2007 |
| CN | 101043276 A | 9/2007 |
| CN | 101340647 A | 1/2009 |

(56) References Cited

FOREIGN PATENT DOCUMENTS

| | | |
|---|---|---|
| CN | 101389147 A | 3/2009 |
| CN | 101389148 A | 3/2009 |
| CN | 101547447 A | 9/2009 |
| DE | 20104862 U1 | 8/2001 |
| DE | 10249414 A1 | 5/2004 |
| EP | 0477952 A2 | 4/1992 |
| EP | 0477952 A3 | 4/1992 |
| EP | 0461583 B1 | 3/1997 |
| EP | 851618 A2 | 7/1998 |
| EP | 0687400 B1 | 11/1998 |
| EP | 0899976 A2 | 3/1999 |
| EP | 0993124 A2 | 4/2000 |
| EP | 0994582 A1 | 4/2000 |
| EP | 1037411 A2 | 9/2000 |
| EP | 1089586 A2 | 4/2001 |
| EP | 1179895 A1 | 2/2002 |
| EP | 1267447 A1 | 12/2002 |
| EP | 1347584 A2 | 9/2003 |
| EP | 1363352 A1 | 11/2003 |
| EP | 1391897 A1 | 2/2004 |
| EP | 1443687 A1 | 8/2004 |
| EP | 1455550 A2 | 9/2004 |
| EP | 1501206 A1 | 1/2005 |
| EP | 1503451 A1 | 2/2005 |
| EP | 1530316 A1 | 5/2005 |
| EP | 1511203 B1 | 3/2006 |
| EP | 1267447 B1 | 8/2006 |
| EP | 1693974 A1 | 8/2006 |
| EP | 1742388 A1 | 1/2007 |
| EP | 1227605 B1 | 1/2008 |
| EP | 1916806 A1 | 4/2008 |
| EP | 1954019 A1 | 8/2008 |
| EP | 1968250 A1 | 9/2008 |
| EP | 1056226 B1 | 4/2009 |
| EP | 1357683 B1 | 5/2009 |
| EP | 2276298 A1 | 1/2011 |
| EP | 1570626 B1 | 11/2013 |
| GB | 2319439 A | 5/1998 |
| GB | 2323252 A | 9/1998 |
| GB | 2370170 A | 6/2002 |
| GB | 2399963 A | 9/2004 |
| GB | 2428149 A | 1/2007 |
| JP | H4189036 A | 7/1992 |
| JP | 05260018 A | 10/1993 |
| JP | 09083450 A | 3/1997 |
| JP | 09162810 A | 6/1997 |
| JP | 09200840 A | 7/1997 |
| JP | 11068675 A | 3/1999 |
| JP | 2000152300 A | 5/2000 |
| JP | 2000341744 A | 12/2000 |
| JP | 2002264617 A | 9/2002 |
| JP | 2002353813 A | 12/2002 |
| JP | 2003148653 A | 5/2003 |
| JP | 2003172827 A | 6/2003 |
| JP | 2004172734 A | 6/2004 |
| JP | 2004222297 A | 8/2004 |
| JP | 2004245963 A | 9/2004 |
| JP | 2004247090 A | 9/2004 |
| JP | 2004264901 A | 9/2004 |
| JP | 2004265624 A | 9/2004 |
| JP | 2004317737 A | 11/2004 |
| JP | 2004349184 A | 12/2004 |
| JP | 2005018175 A | 1/2005 |
| JP | 2005087135 A | 4/2005 |
| JP | 2005134125 A | 5/2005 |
| JP | 2007228603 A | 9/2007 |
| JP | 2008172597 A | 7/2008 |
| KR | 20010055088 A | 7/2001 |
| WO | 9603823 A1 | 2/1996 |
| WO | 9810600 A1 | 3/1998 |
| WO | 0042721 A1 | 7/2000 |
| WO | 0072475 A1 | 11/2000 |
| WO | 0178434 A1 | 10/2001 |
| WO | 0184760 A1 | 11/2001 |
| WO | 0209363 A2 | 1/2002 |
| WO | 0221183 A1 | 3/2002 |
| WO | 0230141 A1 | 4/2002 |
| WO | 02102102 A1 | 12/2002 |
| WO | 03024027 A1 | 3/2003 |
| WO | 03098175 A1 | 11/2003 |
| WO | 2004030154 A2 | 4/2004 |
| WO | 2004034098 A2 | 4/2004 |
| WO | 2004047472 A1 | 6/2004 |
| WO | 2004056019 A1 | 7/2004 |
| WO | 2004059934 A1 | 7/2004 |
| WO | 2004086795 A2 | 10/2004 |
| WO | 2004093471 A2 | 10/2004 |
| WO | 2005062505 A1 | 7/2005 |
| WO | 2005069203 A2 | 7/2005 |
| WO | 2005073897 A1 | 8/2005 |
| WO | 2005079386 A2 | 9/2005 |
| WO | 2005101701 A2 | 10/2005 |
| WO | 2005111959 A2 | 11/2005 |
| WO | 2006011778 A1 | 2/2006 |
| WO | 2006018592 A1 | 2/2006 |
| WO | 2006019392 A1 | 2/2006 |
| WO | 2006039941 A1 | 4/2006 |
| WO | 2006051262 A1 | 5/2006 |
| WO | 2006060754 A2 | 6/2006 |
| WO | 2006077569 A1 | 7/2006 |
| WO | 2006105185 A2 | 10/2006 |
| WO | 2006133609 A1 | 12/2006 |
| WO | 2006136811 A1 | 12/2006 |
| WO | 2007048427 A1 | 5/2007 |
| WO | 2007077451 A1 | 7/2007 |
| WO | 2007088561 A1 | 8/2007 |
| WO | 2007091026 A1 | 8/2007 |
| WO | 2007133507 A2 | 11/2007 |
| WO | 2008008249 A2 | 1/2008 |
| WO | 2008027213 A2 | 3/2008 |
| WO | 2008033298 A2 | 3/2008 |
| WO | 2008039830 A2 | 4/2008 |
| WO | 2008116014 A2 | 9/2008 |
| WO | 2006046088 A1 | 5/2009 |
| WO | 2009132824 A2 | 11/2009 |
| WO | 20090132824 A2 | 11/2009 |
| WO | 2010090999 A1 | 8/2010 |
| WO | 2010132739 A1 | 11/2010 |
| WO | 2011023592 A1 | 3/2011 |
| WO | 2011059705 A1 | 5/2011 |
| WO | 2011100095 A1 | 8/2011 |
| WO | 2011139939 A1 | 11/2011 |
| WO | 2011139942 A1 | 11/2011 |
| WO | 2011152831 A1 | 12/2011 |
| WO | 2012148938 A1 | 11/2012 |
| WO | 2012148940 A1 | 11/2012 |
| WO | 2013122915 A1 | 8/2013 |

OTHER PUBLICATIONS

Examination Report for European patent application 10702806.0 mailed Sep. 12, 2013, 11 pages.
Non-final Office Action for U.S. Appl. No. 13/194,429 mailed Mar. 1, 2013, 22 pages.
Notice of Allowance for U.S. Appl. No. 13/194,429 mailed Jul. 9, 2013, 9 pages.
Author Unknown, "VCSEL Chaotic Synchronization and Modulation Characteristics," Master's Thesis, Southwest Jiatong University, Professor Pan Wei, Apr. 2006, 8 pages (machine translation).
Chowdhury et al., "Multi-service Multi-carrier Broadband MIMO Distributed Antenna Systems for In-building Optical Wireless Access," Presented at the 2010 Conference on Optical Fiber Communication and National Fiber Optic Engineers Conference, Mar. 21-25, 2010, San Diego, California, IEEE, pp. 1-3.
Examiner's Answer to the Appeal Brief for U.S. Appl. No. 12/712,758 mailed Jul. 7, 2014, 12 pages.
Notice of Allowance for U.S. Appl. No. 13/592,502 mailed May 9, 2014, 9 pages.
International Search Report for PCT/US2011/034733 mailed Aug. 1, 2011, 5 pages.
International Preliminary Report on Patentability for PCT/US2011/034733 mailed Nov. 6, 2012, 7 pages.

(56) References Cited

OTHER PUBLICATIONS

Translation of the First Office Action for Chinese Patent Application No. 201180008168.1, mailed Jun. 5, 2014, 9 pages.
Notification of First Office Action for Chinese Patent Application No. 201010557770.8, mailed Jul. 3, 2014, 14 pages.
Non-final Office Action for U.S. Appl. No. 12/618,613 mailed Dec. 29, 2011, 10 pages.
Non-final Office Action for U.S. Appl. No. 12/618,613 mailed Jul. 5, 2012, 9 pages.
Translation of the First Office Action for Chinese Patent Application No. 201080055264.7, mailed Jun. 5, 2014, 6 pages.
Extended European Search Report for European patent application 12777604.5 mailed Oct. 1, 2014, 7 pages.
Extended European Search Report for European patent application 12776915.6 mailed Oct. 13, 2014, 7 pages.
Biton et al., "Challenge: CeTV and Ca-Fi—Cellular and Wi-Fi over CATV," Proceedings of the Eleventh Annual International Conference on Mobile Computing and Networking, Aug. 28-Sep. 2, 2005, Cologne, Germany, Association for Computing Machinery, 8 pages.
Seto et al., "Optical Subcarrier Multiplexing Transmission for Base Station With Adaptive Array Antenna," IEEE Transactions on Microwave Theory and Techniques, vol. 49, No. 10, Oct. 2001, pp. 2036-2041.
Notice of Reexamination for Chinese patent application 20078002293.6 mailed Nov. 28, 2014, 22 pages.
Examination Report for European patent application 10702806.0 mailed Nov. 14, 2014, 7 pages.
Decision on Appeal for U.S. Appl. No. 11/406,976, mailed Nov. 3, 2014, 6 pages.
Non-final Office Action for U.S. Appl. No. 13/688,448 mailed Dec. 29, 2014, 16 pages.
Non-final Office Action for U.S. Appl. No. 14/063,245 mailed Jan. 26, 2015, 22 pages.
Toycan, M. et al., "Optical network architecture for UWB range extension beyond a single complex of cells," Presented at the 33rd European Conference and Exhibition of Optical Communication, Sep. 16-20, 2007, Berlin, Germany, VDE, 2 pages.
Notice of Second Office Action for Chinese Patent Application No. 201010557770.8, mailed Mar. 10, 2015, 13 pages.
Official Communication from the European Patent Office for 10779113.9, mailed Jun. 20, 2012, 2 pages.
International Search Report for PCT/US2007/011034, mailed Apr. 3, 2008, 2 pages.
International Preliminary Report on Patentability for PCT/US2007/011034, mailed Nov. 11, 2008, 8 pages.
International Search Report for PCT/US2013/037090, mailed Jul. 22, 2013, 4 pages.
Non-Final Office Action for U.S. Appl. No. 11/430,113, mailed Apr. 10, 2008, 6 pages.
Notice of Allowance for U.S. Appl. No. 11/430,113, mailed Dec. 8, 2008, 9 pages.
Non-Final Office Action for U.S. Appl. No. 13/595,099, mailed Jun. 20, 2013, 9 pages.
Notice of Allowance for U.S. Appl. No. 13/915,882, mailed Apr. 10, 2015, 12 pages.
Final Office Action for U.S. Appl. No. 14/063,245, mailed Apr. 16, 2015, 24 pages.
Advisory Action for U.S. Appl. No. 14/063,245, mailed Jun. 8, 2015, 3 pages.
Non-Final Office Action for U.S. Appl. No. 14/146,949, mailed Dec. 3, 2014, 14 pages.
Non-Final Office Action for U.S. Appl. No. 14/146,949, mailed Apr. 14, 2015, 16 pages.
Author Unknown, "The I2C-Bus Specification," Version 2.1, Jan. 2000, Philips Semiconductors, 46 pages.
Notice of Third Office Action for Chinese Patent Application 201010557770.8 mailed Sep. 23, 2015, 15 pages.
International Search Report for PCT/US2010/054234, mailed Feb. 28, 2011, 4 pages.
Notice of Allowance for U.S. Appl. No. 14/062,289, mailed Jul. 8, 2015, 9 pages.
Non-final Office Action for U.S. Appl. No. 14/063,630 mailed Jul. 10, 2015, 19 pages.
Non-final Office Action for U.S. Appl. No. 14/172,240 mailed Jun. 5, 2015, 14 pages.
Final Office Action for U.S. Appl. No. 14/172,240 mailed Oct. 9, 2015, 23 pages.
Non-final Office Action for U.S. Appl. No. 14/465,565 mailed Jun. 26, 2015, 15 pages.
Decision on Rejection for Chinese Patent Application No. 201010557770.8, mailed Jan. 27, 2016, 16 pages.
Translation of the First Office Action for Chinese Patent Application No. 201280024385.4, mailed Jan. 28, 2016, 6 pages.
Notice of Allowance for U.S. Appl. No. 14/465,565, mailed Dec. 11, 2015, 8 pages.
Non-final Office Action for U.S. Appl. No. 14/063,630, mailed Dec. 14, 2015, 17 pages.
Advisory Action for U.S. Appl. No. 14/172,240 mailed Dec. 30, 2015, 3 pages.
Non-final Office Action for U.S. Appl. No. 14/518,574, mailed Jan. 6, 2016, 16 pages.
Non-final Office Action for U.S. Appl. No. 14/493,966, mailed Jan. 15, 2016, 12 pages.
Notice of Allowance for U.S. Appl. No. 14/936,007 mailed Feb. 22, 2016, 9 pages.
Decision on Appeal for U.S. Appl. No. 12/712,758 mailed Jun. 27, 2016, 15 pages.
Final Office Action for U.S. Appl. No. 14/063,630, mailed May 12, 2016, 18 pages.
Examiner's Answer to the Appeal Brief for U.S. Appl. No. 14/172,240 mailed Jul. 1, 2016, 34 pages.
Final Office Acttion for U.S. Appl. No. 14/518,574, mailed May 12, 2016, 24 pages.
Final Office Action for U.S. Appl. No. 14/493,966, mailed Jun. 2, 2016, 11 pages.
Non-final Office Action for U.S. Appl. No. 14/966,243 mailed Jan. 25, 2016, 16 pages.
Notice of Allowance for U.S. Appl. No. 14/966,243 mailed Jun. 21, 2016, 8 pages.
Translation of the First Office Action for Chinese Patent Application No. 201280028800.3, mailed Jul. 22, 2016, 8 pages.
International Search Report for PCT/IL2016/050368, mailed Aug. 9, 2016, 7 pages.
Notice of Allowance for U.S. Appl. No. 14/063,630, mailed Jul. 29, 2016, 9 pages.
Non-final Office Action for U.S. Appl. No. 14/518,574, mailed Aug. 11, 2016, 13 pages.
Final Office Action for U.S. Appl. No. 14/518,574, mailed Dec. 29, 2016, 18 pages.
Non-Final Office Action for U.S. Appl. No. 14/687,423, mailed Oct. 14, 2016, 9 pages.
Non-final Office Action for U.S. Appl. No. 14/822,991, mailed Sep. 23, 2016, 5 pages.
Non-Final Office Action for U.S. Appl. No. 14/862,635, mailed Nov. 16, 2016, 18 pages.
Non-Final Office Action for U.S. Appl. No. 15/283,974, mailed Nov. 2, 2016, 42 pages.
Notice of Reexamination for Chinese Patent Application No. 201010557770.8, mailed Dec. 21, 2016, 22 pages.
Examination Report for European Patent Application No. 11701916.6, mailed Jan. 5, 2017, 6 pages.
Notice of Allowance for U.S. Appl. No. 14/822,991, mailed Feb. 8, 2017, 11 pages.
Non-Final Office Action for U.S. Appl. No. 15/179,128, mailed Jan. 13, 2017, 7 pages.
Attygalle et al., "Extending Optical Transmission Distance in Fiber Wireless Links Using Passive Filtering in amjunction with Optimized Modulation," Journal of Lightwave Technology, vol. 24, No. 4, Apr. 2006, 7 pages.

(56) References Cited

OTHER PUBLICATIONS

Bo Zhang et al., "Reconfigurable Multifunctional Operation Using Optical Injection-Locked Vertical-Cavity Surface-Emitting Lasers," Journal of Lightwave Technology, vol. 27, No. 15, Aug. 2009, 6 pages.

Chang-Hasnain, et al., "Ultrahigh-speed laser modulation by injection locking," Chapter 6, Optical Fiber Telecommunication V A: Components and Subsystems, Elsevier Inc., 2008, 20 pages.

Cheng Zhang et al., "60 GHz Millimeter-wave Generation by Two-mode Injection-locked Fabry-Perot Laser Using Second-Order Sideband Injection in Radio-over-Fiber System," Conference on Lasers and Electro-Optics and Quantum Electronics, Optical Society of America, May 2008, 2 pages.

Chrostowski, "Optical Injection Locking of Vertical Cavity Surface Emitting Lasers," Fall 2003, PhD dissertation University of California at Berkely, 122 pages.

Dang et al., "Radio-over-Fiber based architecture for seamless wireless indoor communication in the 60GHz band," Computer Communications, Elsevier B.V., Amsterdam, NL, vol. 30, Sep. 8, 2007, pp. 3598-3613.

Hyuk-Kee Sung et al., "Optical Single Sideband Modulation Using Strong Optical Injection-Locked Semiconductor Lasers," IEEE Photonics Technology Letters, vol. 19, No. 13, Jul. 1, 2007, 4 pages.

Lim et al., "Analysis of Optical Carrier-to-Sideband Ratio for Improving Transmission Performance in Fiber-Radio Links," IEEE Transactions of Microwave Theory and Techniques, vol. 54, No. 5, May 2006, 7 pages.

Lu H H et al., "Improvement of radio-on-multimode fiber systems based on light injection and optoelectronic feedback techniques," Optics Communications, vol. 266, No. 2, Elsevier B.V., Oct. 15, 2006, 4 pages.

Pleros et al., "A 60 GHz Radio-Over-Fiber Network Architecture for Seamless Communication With High Mobility," Journal of Lightwave Technology, vol. 27, No. 12, IEEE, Jun. 15, 2009, pp. 1957-1967.

Reza et al., "Degree-of-Polarization-Based PMD Monitoring for Subcarrier-Multiplexed Signals Via Equalized Carrier/Sideband Filtering," Journal of Lightwave Technology, vol. 22, No. 4, IEEE, Apr. 2004, 8 pages.

Zhao, "Optical Injection Locking on Vertical-Cavity Surface-Emitting Lasers (VCSELs): Physics and Applications," Fall 2008, PhD dissertation University of California at Berkeley, pp. 1-209.

Advisory Action for U.S. Appl. No. 12/712,758 mailed Sep. 16, 2013, 3 pages.

Final Office Action for U.S. Appl. No. 12/712,758 mailed May 24, 2013, 17 pages.

Non-final Office Action for U.S. Appl. No. 12/712,758 mailed Jan. 10, 2012, 14 pages.

Examination Report for European patent application 07835803.3 mailed Aug. 13, 2013, 6 pages.

Extended European Search Report for patent application 10014262.9 mailed Mar. 14, 2011, 6 pages.

International Search Report and Written Opinion for PCT/US2012/034853 mailed Aug. 6, 2012, 12 pages.

International Search Report and Written Opinion for PCT/US2012/034855 mailed Jul. 26, 2012, 10 pages.

Written Opinion of the International Searching Authority for European patent application 11701916.6 mailed Sep. 21, 2012, 10 pages.

International Search Report for PCT/US2011/021799 mailed Apr. 6, 2011, 4 pages.

Arredondo, Albedo et al., "Techniques for Improving In-Building Radio Coverage Using Fiber-Fed Distributed Antenna Networks," IEEE 46th Vehicular Technology Conference, Atlanta, Georgia, Apr. 28-May 1, 1996, pp. 1540-1543, vol. 3.

Bakaul, M., et al., "Efficient Multiplexing Scheme for Wavelength-Interleaved DWDM Millimeter-Wave Fiber-Radio Systems," IEEE Photonics Technology Letters, Dec. 2005, vol. 17, No. 12, pp. 2718-2720.

Cho, Bong Youl et al. "The Forward Link Performance of a PCS System with an AGC," 4th CDMA International Conference and Exhibition, "The Realization of IMT-2000," 1999, 10 pages.

Chu, Ta-Shing et al. "Fiber optic microcellular radio", IEEE Transactions on Vehicular Technology, Aug. 1991, pp. 599-606, vol. 40, Issue 3.

Cooper, A.J., "Fiber/Radio for the Provision of Cordless/Mobile Telephony Services in the Access Network," Electronics Letters, 1990, pp. 2054-2056, vol. 26.

Cutrer, David M. et al., "Dynamic Range Requirements for Optical Transmitters in Fiber-Fed Microcellular Networks," IEEE Photonics Technology Letters, May 1995, pp. 564-566, vol. 7, No. 5.

Dolmans, G. et al. "Performance study of an adaptive dual antenna handset for indoor communications", IEE Proceedings: Microwaves, Antennas and Propagation, Apr. 1999, pp. 138-144, vol. 146, Issue 2.

Ellinger, Frank et al., "A 5.2 GHz variable gain LNA MMIC for adaptive antenna combining", IEEE MTT-S International Microwave Symposium Digest, Anaheim, California, Jun. 13-19, 1999, pp. 501-504, vol. 2.

Fan, J.C. et al., "Dynamic range requirements for microcellular personal communication systems using analog fiber-optic links", IEEE Transactions on Microwave Theory and Techniques, Aug. 1997, pp. 1390-1397, vol. 45, Issue 8.

Gibson, B.C., et al., "Evanescent Field Analysis of Air-Silica Microstructure Waveguides," The 14th Annual Meeting of the IEEE Lasers and Electro-Optics Society, 1-7803-7104-4/01, Nov. 12-13, 2001, vol. 2, pp. 709-710.

Huang, C., et al., "A WLAN-Used Helical Antenna Fully Integrated with the PCMCIA Carrier," IEEE Transactions on Antennas and Propagation, Dec. 2005, vol. 53, No. 12, pp. 4164-4168.

Kojucharow, K., et al., "Millimeter-Wave Signal Properties Resulting from Electrooptical Upconversion," IEEE Transaction on Microwave Theory and Techniques, Oct. 2001, vol. 49, No. 10, pp. 1977-1985.

Monro, T.M., et al., "Holey Fibers with Random Cladding Distributions," Optics Letters, Feb. 15, 2000, vol. 25, No. 4, pp. 206-208.

Moreira, J.D., et al., "Diversity Techniques for OFDM Based WLAN Systems," The 13th IEEE International Symposium on Personal, Indoor and Mobile Radio Communications, Sep. 15-18, 2002, vol. 3, pp. 1008-1011.

Niiho, T., et al., "Multi-Channel Wireless LAN Distributed Antenna System Based on Radio-Over-Fiber Techniques," The 17th Annual Meeting of the IEEE Lasers and Electro-Optics Society, Nov. 2004, vol. 1, pp. 57-58.

Author Unknown, "ITU-T G.652, Telecommunication Standardization Sector of ITU, Series G: Transmission Systems and Media, Digital Systems and Networks, Transmission Media and Optical Systems Characteristics—Optical Fibre Cables, Characteristics of a Single-Mode Optical Fiber and Cable," ITU-T Recommendation G.652, International Telecommunication Union, Jun. 2005, 22 pages.

Author Unknown, "ITU-T G.657, Telecommunication Standardization Sector of ITU, Dec. 2006, Series G: Transmission Systems and Media, Digital Systems and Networks, Transmission Media and Optical Systems characteristics—Optical Fibre Cables, Characteristics of a Bending Loss Insensitive Single Mode Optical Fibre and Cable for the Access Network," ITU-T Recommendation G.657, International Telecommunication Union, 20 pages.

Author Unknown, RFID Technology Overview, Date Unknown, 11 pages.

Opatic, D., "Radio over Fiber Technology for Wireless Access," Ericsson, Oct. 17, 2009, 6 pages.

Paulraj, A.J., et al., "An Overview of MIMO Communications—A Key to Gigabit Wireless," Proceedings of the IEEE, Feb. 2004, vol. 92, No. 2, 34 pages.

Pickrell, G.R., et al., "Novel Techniques for the Fabrication of Holey Optical Fibers," Proceedings of SPIE, Oct. 28-Nov. 2, 2001, vol. 4578, 2001, pp. 271-282.

Roh, W., et al., "MIMO Channel Capacity for the Distributed Antenna Systems," Proceedings of the 56th IEEE Vehicular Technology Conference, Sep. 2002, vol. 2, pp. 706-709.

(56) References Cited

OTHER PUBLICATIONS

Schweber, Bill, "Maintaining cellular connectivity indoors demands sophisticated design," EDN Network, Dec. 21, 2000, 2 pages, http://www.edn.com/design/integrated-circuit-design/4362776/Maintaining-cellular-connectivity-indoors-demands-sophisticated-design.

Seto, I., et al., "Antenna-Selective Transmit Diversity Technique for OFDM-Based WLANs with Dual-Band Printed Antennas," 2005 IEEE Wireless Communications and Networking Conference, Mar. 13-17, 2005, vol. 1, pp. 51-56.

Shen, C., et al., "Comparison of Channel Capacity for MIMO-DAS versus MIMO-CAS," The 9th Asia-Pacific conference on Communications, Sep. 21-24, 2003, vol. 1, pp. 113-118.

Wake, D. et al., "Passive Picocell: A New Concept n Wireless Network Infrastructure," Electronics Letters, Feb. 27, 1997, vol. 33, No. 5, pp. 404-406.

Windyka, John et al., "System-Level Integrated Circuit (SLIC) Technology Development for Phased Array Antenna Applications," Contractor Report 204132, National Aeronautics and Space Administration, Jul. 1997, 94 pages.

Winters, J., et al., "The Impact of Antenna Diversity on the Capacity of Wireless Communications Systems," IEEE Transcations on Communications, vol. 42, No. 2/3/4, Feb./Mar./Apr. 1994, pp. 1740-1751.

Yu et al., "A Novel Scheme to Generate Single-Sideband Millimeter-Wave Signals by Using Low-Frequency Local Oscillator Signal," IEEE Photonics Technology Letters, vol. 20, No. 7, Apr. 1, 2008, pp. 478-480.

Second Office Action for Chinese patent application 20078002293.6 mailed Aug. 30, 2012, 10 pages.

International Search Report for PCT/US2010/022847 mailed Jul. 12, 2010, 3 pages.

International Search Report for PCT/US2010/022857 mailed Jun. 18, 2010, 3 pages.

Decision on Appeal for U.S. Appl. No. 11/451,237 mailed Mar. 19, 2013, 7 pages.

Decision on Rejection for Chinese patent application 200780022093.6 mailed Feb. 5, 2013, 9 pages.

International Search Report and Written Opinion for International patent application PCT/US2007/013802 mailed May 3, 2008, 12 pages.

* cited by examiner

OPTIMIZING REMOTE ANTENNA UNIT PERFORMANCE USING AN ALTERNATIVE DATA CHANNEL

BACKGROUND

The disclosure relates generally to a wireless distribution system (WDS) and more particularly to techniques for monitoring and optimizing a distributed antenna system.

Wireless communication is rapidly growing, with ever-increasing demands for high-speed mobile voice communication. Wireless distribution systems are used extensively to extend the reach of base stations of cellular service providers. One example of a wireless distribution system is a distributed antenna system (DAS). DASs are particularly useful for deployment inside buildings or other indoor environments where client devices may not otherwise be able to effectively receive radio-frequency (RF) signals from a source, such as a base station, for example. They may be used for both voice and data applications. Illustrative applications for distributed antenna systems to provide or enhance coverage for wireless services include public safety, cellular telephony, local access network (LANs), wireless local access networks (wireless LANs), location tracking and medical telemetry inside buildings and over campuses. Distributed antenna systems may also be used for other radio-based communications services. As an example, local area wireless services (e.g., so-called "wireless fidelity" or "Wi-Fi" systems) and wide area wireless services are being deployed in many different types of areas, e.g., coffee shops, airports, libraries, and the like. Wireless distribution systems (WDSs) communicate with wireless devices called "clients," "client devices," "wireless client devices," or "wired client devices," which reside within the wireless range or "cell coverage area" in order to communicate with an access point device.

The manner in which a distributed antenna system provides or enhances coverage is through a plurality of spatially separated antennas. The distributed antenna system communicates with a variety of commercial communications systems to distribute their services, especially voice communications, to clients within range of the distributed antenna system.

In so doing, the distributed antenna system provides a physical layer or infrastructure for delivering signals from a base station or other radio transceiver to/from a user equipment of an end user. As a physical layer, the distributed antenna system knows nothing about how or what the user equipment is doing in the distributed antenna system coverage area, other than whatever a network carrier may tell the distributed antenna system. For example, the distributed antenna system does not know the strength of a signal received by a user equipment in the distributed antenna system coverage area. Nor does it know whether the user equipment is making a digital or audio call. The distributed antenna system cannot even tell how many pieces of user equipment are using the distributed antenna system. It is the service provider and not the distributed antenna that has the means for tracking this information.

What is needed is a way to: educate a distributed antenna system about the pieces of user equipment that are using the distributed antenna system; provide carriers with additional information about user equipment using their service useable to improve the quality of the signal and service of the subscribers; and identify, monitor, and resolve previously unidentifiable problems due to faults in the DAS system to provide a better user experience to the carrier's subscribers.

SUMMARY

Technologies are described for using the capabilities of devices and applications in user and like equipment to educate a distributed antenna system about what the user equipment is doing in the distributed antenna system's coverage area.

One embodiment of this disclosure relates to a system for managing communication over a network. The system includes a remote antenna unit. The remote antenna unit includes a transceiver configured for uplinking and downlinking a signal of a cellular service; a transceiver configured for uplinking and downlinking data of a non-cellular service; and a combiner/splitter. The combiner/splitter is configured for combining an uplinked signal of the cellular service signal with an uplinked signal of the data of a non-cellular service onto a conductor of a cellular service and for splitting the downlinked signal of the cellular signal from a downlinked signal of the data of a non-cellular service transmitted over a conductor of a cellular service. The combiner/splitter is responsive to a signal in a management channel. The management channel includes a first field of data for controlling or monitoring the signal of the cellular service and a second field of data including the data of a non-cellular service.

An additional embodiment of the disclosure relates to a network optimization system. The network optimization system according to this disclosure may include a remote antenna, a router, a performance data collector, and an optimizer controller. The remote antenna unit includes a transceiver configured for uplinking and downlinking a signal of a cellular service, and a transceiver configured for uplinking and downlinking a signal of at least one of a Bluetooth or Wi-Fi or Zigbee service. The router is configured to route performance data collected from at least one user equipment configured for connecting to the remote antenna unit, where the user equipment is configured to execute an instance of a data service configured to collect data on a performance of the network. The performance data collector is configured to aggregate the collected performance data. The optimizer controller is configured to correlate the aggregated performance data to determine adjustments to the network optimization system based on the correlated performance data.

An additional embodiment of the disclosure relates to a method for monitoring and optimizing a network. The method may include configuring a remote antenna unit with a first transceiver for uplinking and downlinking a signal of a cellular service and with a second transceiver for uplinking and downlinking of the signal of at least one of a Bluetooth or Wi-Fi or Zigbee service. Performance data is collected from at least one user equipment configured for connecting to the remote antenna unit. The collected performance data is routed to a performance data collector configured to aggregate the performance data. The aggregated performance data is correlated. The network is optimized based on the correlated performance data.

Another embodiment of the disclosure relates to a method for optimizing a network. The method for optimizing a network of this disclosure may include the steps of configuring a remote combiner/splitter to respond to a signal in a management channel. A first field of data may be provided in the management channel. The first field of data is for controlling or monitoring the signal of the cellular service. A second field of data may be provided in the management channel. The second field of data includes the data of a non-cellular service.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely illustrative, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
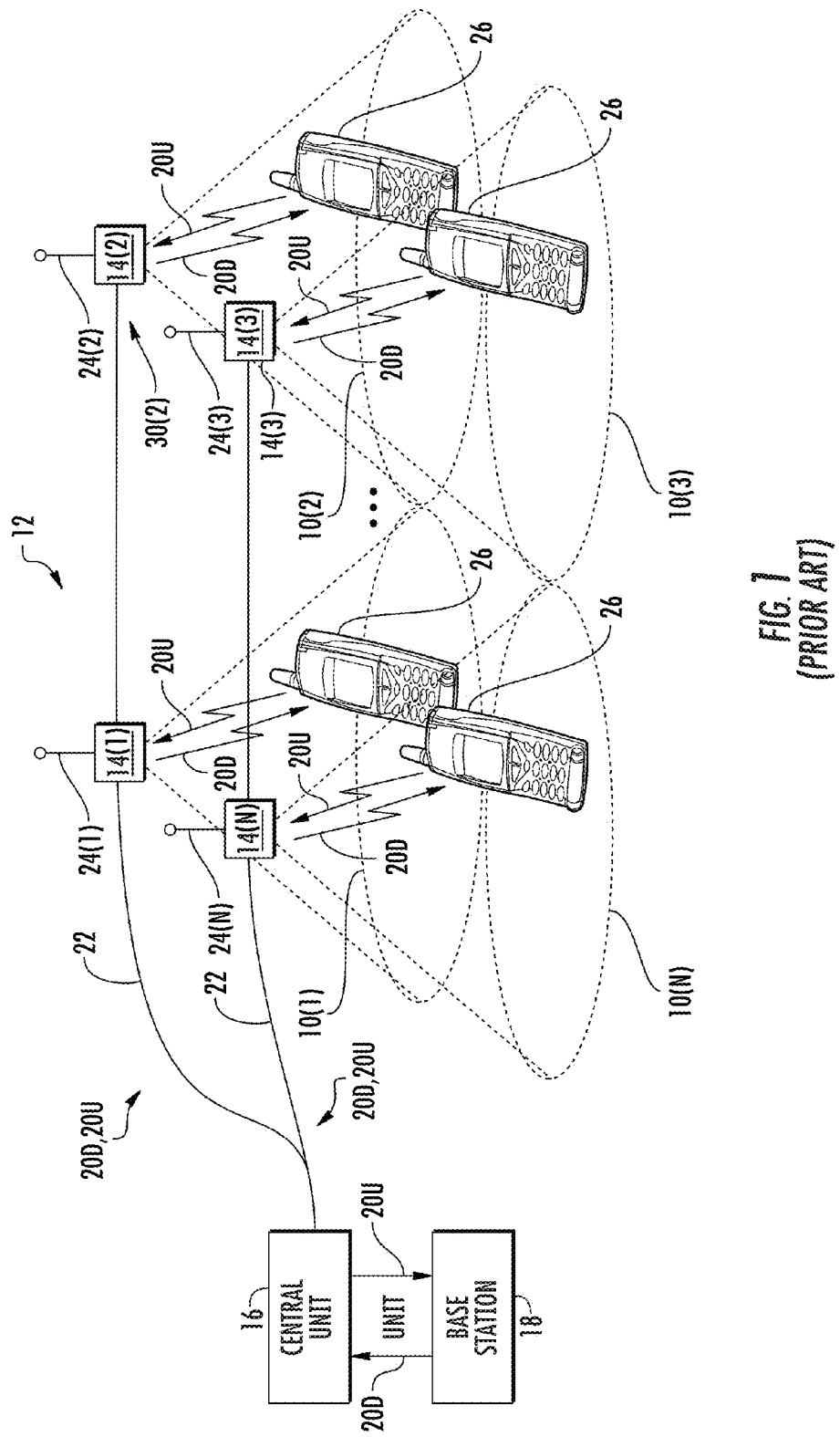
FIG. 1 depicts a distributed antenna system of the prior art serving a plurality of user equipment devices.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the FIGS, can be arranged, substituted, combined, separated, and designed in a wide variety of different configurations, all of which are explicitly contemplated herein.

Technologies are described herein for systems and methods to optimize communications between a distributed antenna system having a plurality of remote antenna units and a plurality of user equipment devices served by the distributed antenna system or in the coverage area of the DAS. The distributed antenna system may serve a specific area or site, such as a portion of a large building, a building or a site, or even a group of co-located buildings. A method and system for optimizing a network according to this disclosure may include configuring a remote antenna unit with a first transceiver for uplinking and downlinking a signal of a cellular service and with a second transceiver for uplinking and downlinking of the signal of a non-cellular service such as a Bluetooth, Wi-Fi, or Zigbee service. Performance data is collected from at least one user equipment configured for connecting to the remote antenna unit. The collected performance data is routed to a performance data collector configured to aggregate the performance data. The aggregated performance data is correlated. The network is optimized based on the correlated performance data.

In describing more fully this disclosure, we make reference to the following definitions:

By the term "communication service" is meant digital data services including but not limited to Wi-Fi, Bluetooth, ZigBee, Ethernet, DSL, LTE, Wireless Access Points (WAPs), PCS, 2G, 3G, 4G, DSL (Digital Subscriber Line), Long Term Evolution (LTE), Remote Radio Heads (RRH), Radio over Fiber Optic Cable (RoF), OCS band, WiMax (Worldwide Interoperability for Microwave Access), LAN, CDMA, TDMA, GSM, WDM, Satellite radio, RFID, NFC, Wi-Gig and WLAN.

By the term "distributed antenna system" or DAS is meant an antenna system that includes a plurality of spatially separated antennas. The DAS may communicate with a variety of commercial communications systems to distribute the services to clients within range of the distributed antenna system. The distributed antenna system may be an optical fiber-based distributed antenna system, but such is not required, and these systems may include both optical fibers and standard wired communications cables, such as those with copper conductors. It will be appreciated that the distributed antenna system may be a wire-based or a wireless system.

By the term "head end unit (HEU)" is meant a plurality of radio distribution/combiner (RDCs) and a switching matrix for combining a plurality of communications signals into a broad band signal for further transmission, such as to an optical input unit, and for splitting a broadband signal from an optical input unit into individual communication signals, thus allowing two-way communications.

By the term "radio distribution/combiner (RDC) is meant a device that combines narrowband signals into broadband signals and splits broadband signals into narrowband signals. The signals are illustratively electrical signals but may be an optical or other signal. The RDCs may be RDC cards, e.g., circuit boards with the appropriate combining and splitting functionality well known in the art By the term "optical Interface module" is meant a device that converts broadband electrical signals into broadband optical signals and vice versa.

By the term "remote antenna unit (RAU)" or remote unit ("RU") is meant a device connected to an optical Interface module that converts and filters a broadband optical signal into a narrow electrical signal and vice versa. The RAU provides the wireless access front end.

By the term "clients or recipients of these services" is meant devices such as cellular phones, smart phones, wireless computers, wireless lap-top computers, mobile devices such as tablet computers, pad computers, personal digital assistant, and wireless sensors or networks of sensors, such as mesh network sensors. These examples are not intended to be limiting, and the present disclosure is not limited to these examples of client devices. More generally, a client is computer hardware or software that accesses a service made available by a server.

By the term "GEM" is meant gigabit Ethernet module.

By the term "SFP" is meant small form factor plug.

Turning now to the drawings, FIG. 1 depicts an example of a prior art wireless distribution system (WDS). FIG. 1A illustrates distribution of communications services to coverage areas 10(1)-10(N) of a DAS 12, wherein 'N' is the number of coverage areas. These communications services can include cellular services, wireless services such as RFID tracking, Wireless Fidelity (Wi-Fi), local area network (LAN), WLAN, and combinations thereof, as examples. The coverage areas 10(1)-10(N) may be remotely located. In this regard, the remote coverage areas 10(1)-10(N) are created by and centered on remote antenna units 14(1)-14(N) connected to a central unit 16 (e.g., a head-end controller or head-end unit). The central unit 16 may be communicatively coupled to a base station 18. In this regard, the central unit 16 receives downlink communications signals 20D from the base station 18 to be distributed to the remote antenna units 14(1)-14(N). The remote antenna units 14(1)-14(N) are configured to receive downlink communications signals 20D from the central unit 16 over a communications medium 22 to be distributed to the respective coverage areas 10(1)-10(N) of the remote antenna units 14(1)-14(N).

Each remote antenna unit 14(1)-14(N) may include an RF transmitter/receiver (not shown) and a respective antenna 24(1)-24(N) operably connected to the RF transmitter/receiver to wirelessly distribute the communications services to user equipment 26, e.g., cellular telephone client devices, within their respective coverage areas 10(1)-10(N). The remote antenna units 14(1)-14(N) are also configured to receive uplink communications signals 20U from the user equipment 26 in their respective coverage areas 10(1)-10(N) to be distributed to the base station 18. The size of a given coverage area 10(1)-10(N) is determined by the amount of RF power transmitted by the respective remote antenna unit 14(1)-14(N), the receiver sensitivity, antenna gain and the RF environment, as well as by the RF transmitter/receiver sensitivity of the user equipment 26. User equipment 26 usually have a fixed RF receiver sensitivity, so that the above-mentioned properties of the remote antenna units 14(1)-14(N) mainly determine the size of their respective remote coverage areas 10(1)-10(N).

Figure 2:
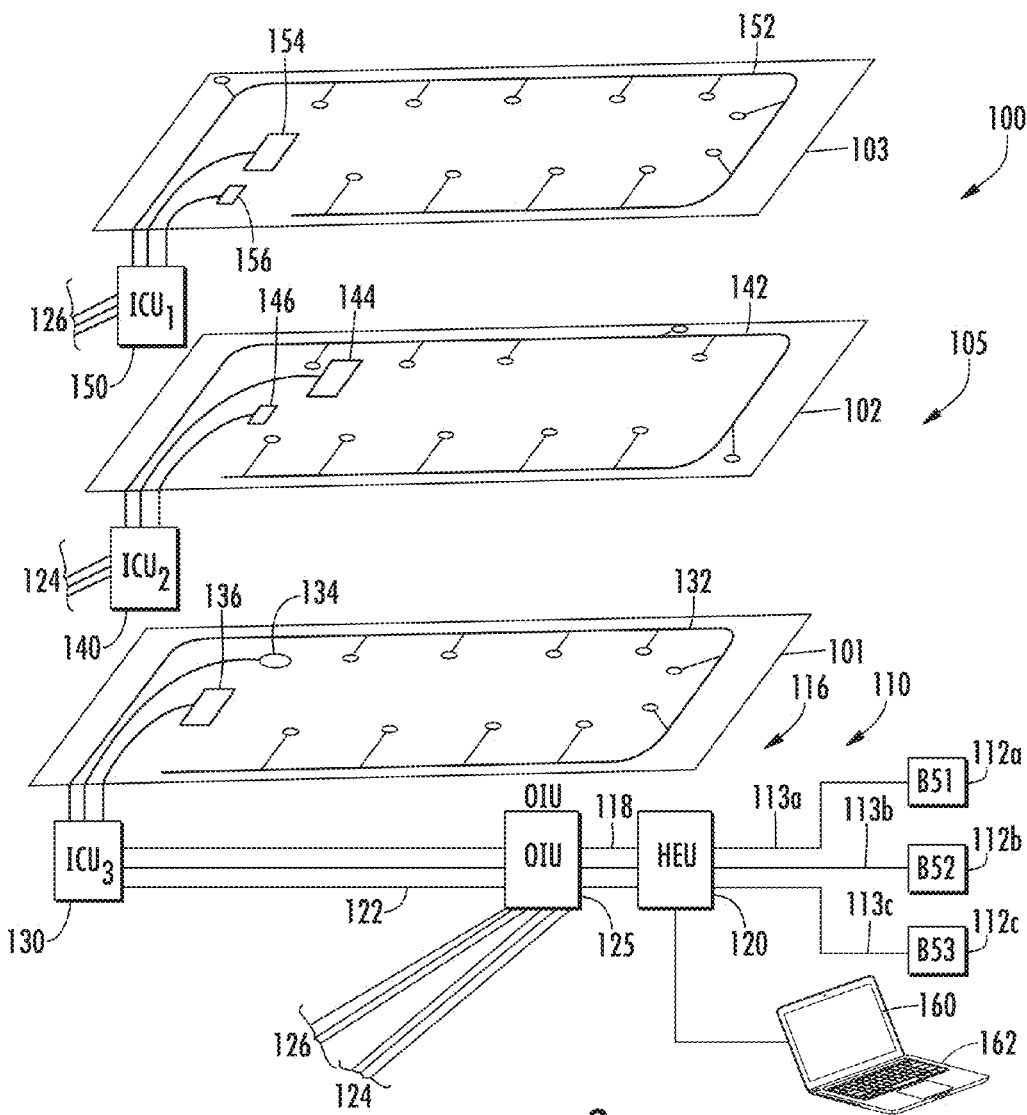
FIG. 2 depicts a schematic diagram of an illustrative communications system of the prior art configured to distribute communications signals within an installation, such as a building.

One illustrative wireless distribution systems (WDS) is a distributed antenna system (DAS). FIG. 2 depicts an example of a distributed antenna system (DAS) 100 for a first 101, a second 102 and a third 103 floor, respectively, of a building 105. In this example a plurality of communications services 110 are provided, such communications coming from first, second and third base stations 112a, 112b 112c over cables 113a, 113b, 113c respectively, from service providers. The services are input to a head end unit (HEU) 120 for routing through distributed antenna system 100. The distributed antenna system 100 is controlled by a computer 160 with operator input device 162. The computer may include local memory and may have access to remote memory, as well as computer programs stored on at least one non-transitory medium, either locally or remotely. The computer 160 may be connected directly to the head end unit 120 and may be in control of other elements of the distributed antenna system via wired connections or remotely, as shown. The computer system may also control an optical interface unit 125.

The communication services are illustratively routed through distributed antenna system 100 as shown in FIG. 2. Cable or hard wire outputs 118 from the head end unit 120 may connect to the optical interface unit 125 and then to interconnect units 130, 140, 150 for serving the first, second and third floors 101, 102, 103 of building 105. Interconnect units 130, 140, 150 provide mechanical interfaces and power to the cable outputs from the interconnect units.

The computer 160 may be used to control the head end unit, the optical input unit and the interconnect units of the system. The computer may also control or monitor switches and switch matrices of the head end unit and optical interface unit useful in operation of distributed antenna systems. The computer may be supplied with a non-transitory memory and a computer program useful for routing the signals through the system. Within each floor, the services are then provided separately, as shown. Thus, the first floor 101 may be provided, through its interconnect unit 130, with an Ethernet wire distribution 132, a Wi-Fi hot spot 134 and a telecommunication antenna 136. In this example, similar services may be provided to the second and third floors 102, 103, through their interconnect units 140, 150 with Ethernet lines 142, 152, Wi-Fi hot spots 144, 154 and telecommunications antennas 146, 156. The Wi-Fi hot spot and/or telecommunications antenna may be provided by a remote antenna unit which may include an RF transmitter/receiver (not shown) and a respective antenna (not shown) operably connected to the RF transmitter/receiver to wirelessly distribute the communications services to user equipment (not shown). Examples of user equipment include a cellular phone, a smart phone, or other device, such as a tablet or a personal digital assistant.

Users of cellular phones and other communications devices may have a connection to a second service. The second service may be a Wi-Fi connection, a Bluetooth connection, or other radio-frequency channel. The connection of a communications device to one of these second services, such as Wi-Fi, may occur simultaneously with a connection of the communications device to a first cellular service. Alternatively, the communications device may be connected to the Wi-Fi only so that there is no connection of the communications device to a cellular service at the time that the communications device is connected to the Wi-Fi service. One way in the prior art to achieve a connection of a communications device to such a second service is by use of a gigabit Ethernet module (GEM) depicted in FIG. 3.

Figure 3:
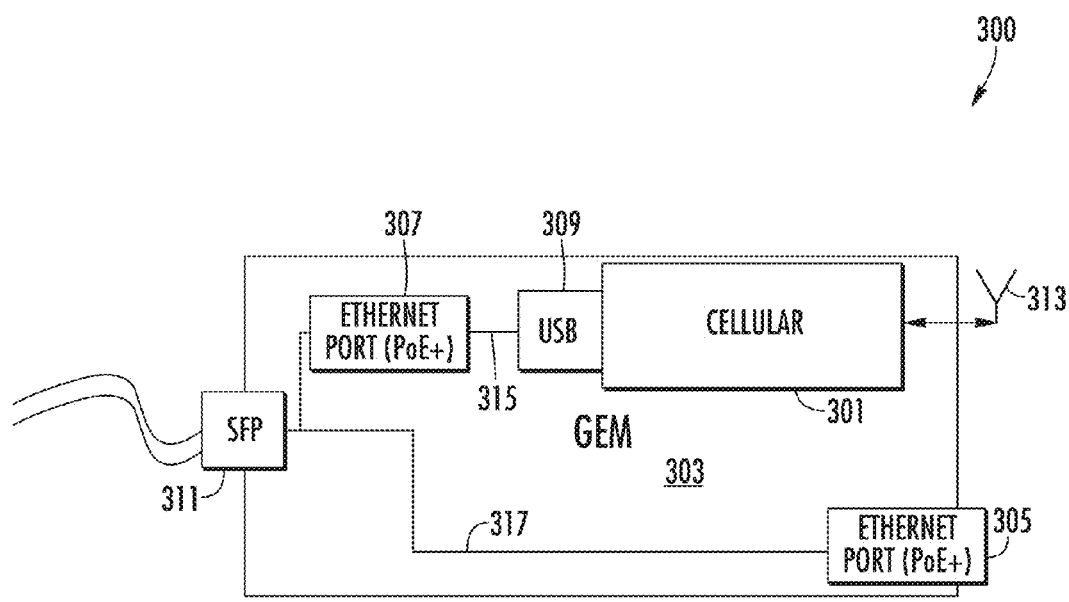
FIG. 3 depicts a prior art Gigabit Ethernet Module (GEM) useful for incorporating an internet connection into a remote antenna unit.

In FIG. 3, remote antenna unit 300 includes a cellular transceiver 301. The remote antenna unit connects via a wired connection 311 to a communication input, such as an optical Interface module from an optical interface unit, discussed above with respect to the building distribution. The connection 311 may be a small form factor pluggable (SFP) connector or plug. In this example, the remote antenna unit 300 also includes a GEM 303 with an Ethernet PoE+ port 305, i.e., providing power as well as a communications connection. A second PoE+ port 307 connects power and communication via a USB connector 309 to the cellular transceiver 301. The cellular transceiver 301 and remote antenna unit also include a power output, e.g., antenna 313 for sending and receiving communications signals. In this example, the cellular transceiver takes advantage of the power available from the PoE+ port and also utilizes the available bandwidth of one or more of the GEM ports. In this example, the remote antenna unit may support a plurality of communications bands, e.g. four bands. These bands may include, for example, a Bluetooth channel, a Wi-Fi channel, a Personal Communications Services (PCS) band, an LTE 700 radio band, a U.S. Cellular™ band and an Advanced Wireless Services (AWS) band. Other communication service bands include frequency ranges such as 400-700 MHz, 700 MHz-1 GHz, 1 GHz-1.6 GHz, and 1.6 GHz-2.7 GHz. The connections with a PoE+ port may be via composite cable or in another manner. A disadvantage of this system is that the GEM requires two fiber optic lines 315, 317, which is two pairs of fiber optic lines, to make the connections for both cellular service and the second service.

Having thus provided an overview of a wireless distribution system, we now turn to features provided by this disclosure. Broadly speaking, a method and system for optimizing a network may include configuring a remote antenna unit with a first transceiver for uplinking and downlinking a signal of a cellular service and with a second transceiver for uplinking and downlinking of the signal of non-cellular service such as Bluetooth, Wi-Fi, or Zigbee service. Performance data is collected from at least one user equipment configured for connecting to the remote antenna unit. The collected performance data is routed to a performance data collector configured to aggregate the performance data. The aggregated performance data is correlated. The network is monitored and optimized based on the correlated performance data.

Figure 4:
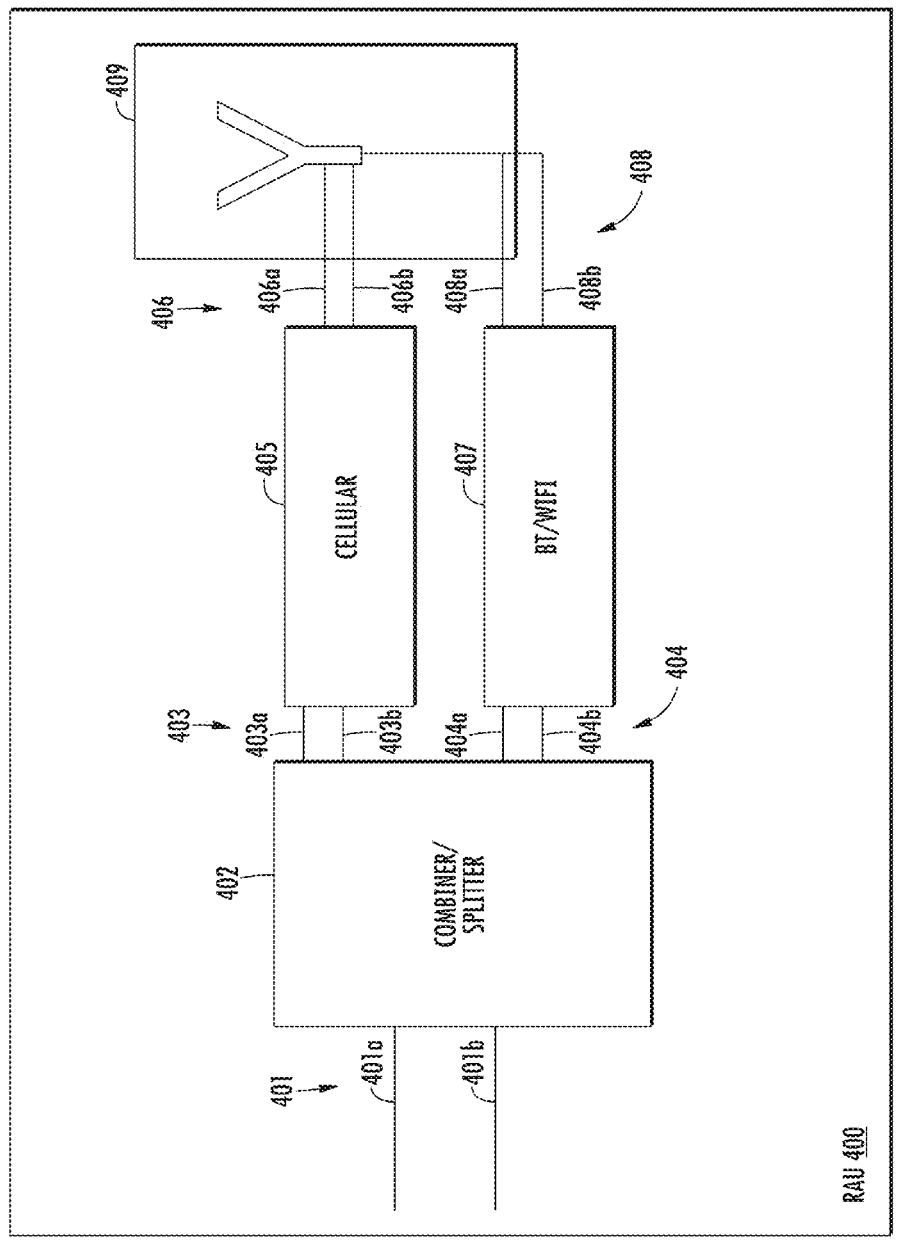
FIG. 4 schematically depicts a remote antenna unit according to the present disclosure.

A remote antenna unit (RAU) according to the present disclosure is depicted in FIG. 4. Remote antenna unit 400 connects cellular providers at a head end unit to cellular equipment users through one or more antennae. Remote antenna unit 400 receives and sends signals from/to the cellular equipment users to the head end unit as described in FIG. 8 below.

As shown in FIG. 4, remote antenna 400 according to this disclosure comprises a cellular transceiver 405, a BT/WI-FI transceiver 405, a combiner splitter 402, a radio antenna 409 (or two separate antenna elements if the radio antenna 409 is so configured), and cables 401, 403, and 404. Each of cables 401, 403, 404, and 406 is a pair of conductors of a cellular service. For example, each cable may be a pair of fiber optic or metallic wires for use in transmitting a cellular service. The individual wires in each pair are shown in the figure with the letters "a" and "b". Illustratively, the wires denoted with the letter "a" depict the wires used for downlinking a signal to a user equipment (not shown) and the wires denoted with the letter "b" depict the wires used for uplinking a signal from the user equipment.

Illustratively, cable 401 is a pair of optical fibers and cables 403, 404, and 406 are a pair of metal wires. More precisely, cable 401 illustrates a pair of optical fibers connecting the remote antenna unit (RAU) to a head end unit (HEU) (not shown) and between that cable 401 and the combiner/splitter lies an optical to electrical signal converter and vice versa (not shown) that converts the optical signal on the optical fibers to an electrical signal and vice versa, which is applied to the combiner/splitter in the illustrative example.

The cellular transceiver 405 is a transceiver configured for uplinking and downlinking a signal of a cellular service. The BT/WI-FI transceiver 407 is a transceiver configured for uplinking and downlinking data services of a Bluetooth or a Wi-Fi service. While transceiver 407 is shown in this illustrative examples as a Bluetooth and/or Wi-Fi receiver, it will be appreciated that data of transceiver 407 may be selected from the group of services consisting of Bluetooth, Wi-Fi, and ZigBee. Alternatively, the service may be any non-cellular service. By "non-cellular service" is meant any wireless service that is other than a cellular service.

The combiner/splitter 402 is a combiner/splitter configured for combining an uplinked signal of the cellular service with an uplinked signal of the data of the Bluetooth or Wi-Fi service (or any other non-cellular service) onto a conductor (e.g., a fiber optic or metallic wire) of a cellular service and for splitting the downlinked signal of the cellular signal from a downlinked signal of the data of a non-cellular service transmitted over a conductor (e.g., a fiber optic or metallic wire) of a cellular service.

Figure 5:
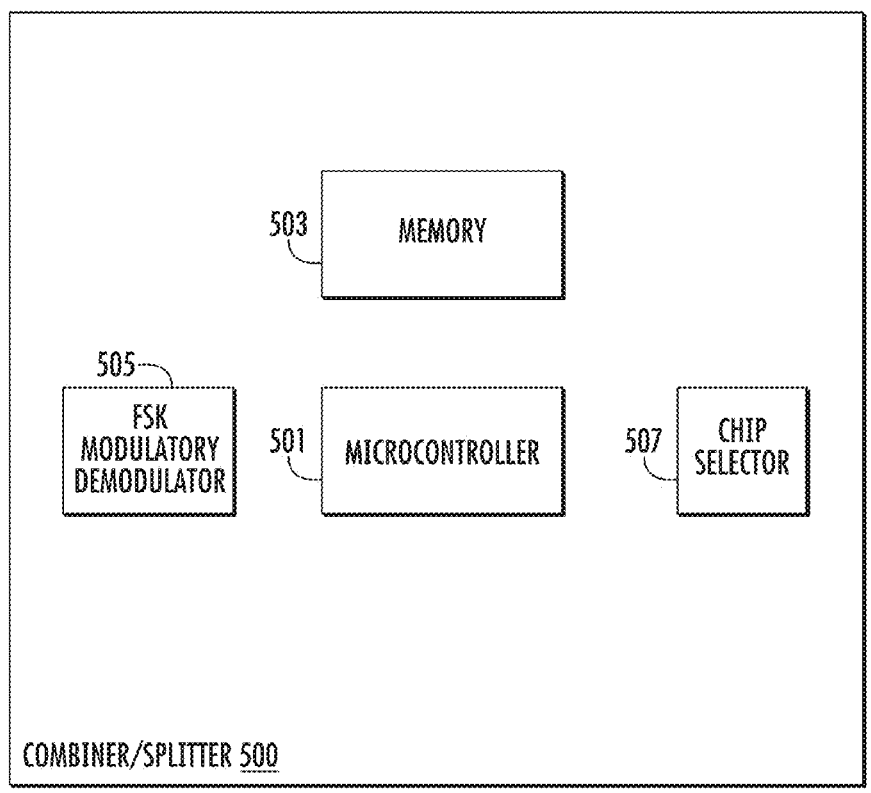
FIG. 5 is a schematic depiction of a combiner/splitter according to the present disclosure.

A combiner/splitter according to the present disclosure is depicted schematically in FIG. 5. This embodiment of a combiner/splitter 500 may be a discrete piece of hardware, as shown. The combiner splitter includes a microcontroller 501 which is operably connected to a memory 503. The memory may include one or more computer programs for operating the combiner splitter. Alternatively, the memory 503 may reside internally in the microcontroller chip.

An important component of the illustrative combiner/splitter is modulator/demodulator 505. Modulator/demodulator 505 is used to modulate different signals so that they may be simultaneously transmitted over the same conductor with the cellular services associated signals, and to demodulate simultaneously transmitted signals over the cable into different signals. More specifically, modulator/demodulator 505 modulates uplink signals from different pieces of user equipment (not shown) for simultaneous transmission over uplink conductor 401b (shown in FIG. 4). In addition, modulator/demodulator 505 demodulates downlink signals simultaneously with the cellular services associated signals, transmitted over downlink conductor 401a into different signals for transmission of each different signal to a different piece of user equipment. It will be appreciated that a modulator/demodulator similar to modulator/demodulator 505 would illustratively reside upstream of modulator/demodulator 505 typically in a head end unit (HEU) of the distributed antenna system to perform a similar function as that performed by modulator/demodulator 505 but on the signals applied on the upstream end of the distributed antenna system.

In the illustrative example, modulator 505 employs FSK modulation. Frequency-shift keying (FSK) is a frequency modulation scheme in which digital information is transmitted through discrete frequency changes of a carrier wave. Alternatively, the modulator 505 may employ phase-shift keying (PSK), amplitude-shift keying (ASK), quadrature amplitude modulation (QAM) or other modulation schemes.

The FSK modulator is used to modulate and demodulate signals to and from the combiner splitter. As seen in FIG. 4, the modulator 505 may be a modem or other discrete component. In other embodiments, the modulator may be a computer program residing in the memory 503 of the combiner/splitter.

Referring still to FIG. 4, the remote antenna illustratively further includes a serial peripheral interface (SPI) bus (not shown) for interfacing data to and from the Bluetooth/Wi-Fi transceiver. A serial peripheral interface may be a simple 3-wire device for connecting to a control signal such as a clock, and also a line for master-in slave-out and third line for master-out, slave in. Other embodiments may use 2 or 4 lines. The clock signal may be provided within the combiner/splitter or may be provided from an external source. While the SPI bus is very useful, other interfaces may also be used, such as a bus conforming to the RS-232 or other standard.

Referring again to FIG. 4 and as previously explained, cables 401, 403, and 406 are a pair of conductors of a cellular service. For example, each cable may be a pair of fiber optic or metallic wires for use in transmitting a cellular service. As also previously explained, the individual wire in each cable pair is denoted by the letters "a" and "b," respectively. The wire denoted by the letter "a" illustratively represents the conductor of cellular service used to transmit the downlink signal and the fiber denoted by the letter "b" is the conductor of cellular service used to transmit the uplink signal. As seen in FIG. 4, the path taken by a downlink cellular signal applied by a radio source through the distributed antenna system to remote antenna unit 400 is seen in FIG. 4 to travel downlink conductor 401a to the combiner/splitter 402, downlink conductor 403a to the cellular transceiver 405, and downlink conductor 406a to the antenna 409. In the uplink path, the signal travels uplink conductor 406b to the cellular transceiver, uplink conductor 403b to the combiner splitter 402, and uplink conductor 401b through the distributed antenna system to the radio source.

The path taken by a downlink BT/WIFI signal applied by a BT/WIFI source through the distributed antenna system to remote antenna unit 400 is seen in FIG. 4 to travel downlink conductor 401a to the combiner/splitter 402, downlink conductor 404a to the BT/WIFI transceiver 407, and downlink conductor 408a to the antenna 409. In the uplink path, the signal travels uplink conductor 408b to the BT/WIFI transceiver, uplink conductor 404b to the combiner splitter 402, and uplink conductor 401b through the distributed antenna system to the BT/WIFI source.

Figure 6:
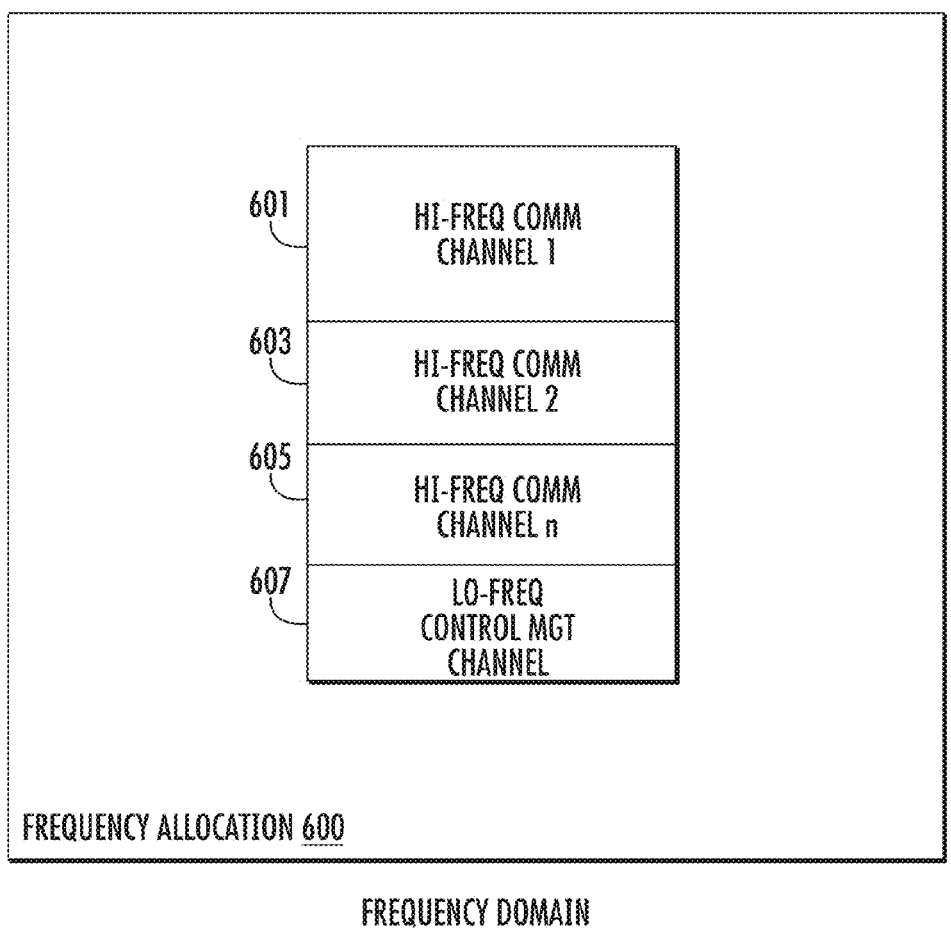
FIG. 6 depicts a frequency domain depiction of an illustrative allocation of bandwidth in a conductor of a cellular service according to the present disclosure.

In conventional distributed antenna systems, the cable 401 illustratively comprises the fiber optic wire 401a for the downlink signal and the fiber optic wire 401b for the uplink signal. In conventional distributed antenna systems, the cable 401 would be used to provide cellular services. The data service would be provided by a gigabit Ethernet module (GEM) as explained in connection with FIG. 3. To deliver cellular services, both fiber optic wires 401a and 401b illustratively carry several carrier frequencies and a management channel. The carrier frequencies typically operate at higher frequencies than the frequency of the management channel The management channel typically operates at a very low frequency band in comparison to the frequencies of the carrier signals FIG. 6 shows a frequency domain depiction of an illustrative set of signals that may be simultaneously transmitted over the fiber optic pair supporting the cellular services in either the uplink or downlink direction. More specifically, FIG. 6 shows the simultaneous signal transmissions as a high-frequency communication channel 1 denoted by number 601, a high-frequency communication channel 2 denoted by number 603, a high-frequency channel n denoted by number 605, and a low-frequency channel denoted by number 607.

Illustratively, the cable (e.g., fiber optic wire 401a, 401b in FIG. 4) may carry six carrier frequencies. These six cellular services illustratively range from 700 MHz to 2.36 GHz. In addition, each fiber optic wire 401a, 401b carries the low frequency management channel which is typically 5 KHz to 5 MHz. The management channel is typically FSK (frequency shift key) modulated by FSK modulator/demodulator 505, which has been previously described, although other modulation schemes may be used to modulate the management channel.

In an illustrative embodiment of this disclosure, the management channel is a single channel with a single frequency band and is modulated using FSK modulation. In a conventional remote antenna unit that employs FSK modulation to modulate the management channel, the bits are used to control the HW elements that control/have effect on the signals of the cellular service. Hence, a carrier is actually utilizing the management channel when controlling and/or monitoring the signal being transmitted/received.

An operator too is utilizing the management channel when controlling/monitoring the equipment of the distributed antenna system. For example, an operator of the distributed antenna system may use the management channel to control the power levels of components of the remote antenna unit. The operator may also use management channel to control power levels of other components within the distributed antenna system Where the operator controls the DAS system, he is actually utilizing the management channel the instructions on the management channel may be executed by a processor residing in the component to which the control instruction is directed. For example, if the control instruction in the management channel is directed to the remote antenna unit (RAU) to increase its power, a processor in the remote antenna unit (RAU) may recognize and execute that instruction. Alternatively, the instruction may be executed by another processor in the distributed antenna system.

Illustratively, a carrier or DAS operator may employ a graphical user interface (GUI) to insert control data in the management channel for use in controlling components of the DAS in accordance with the teachings of this disclosure.

Most of the time, the data capacity of the management channel is not fully utilized. This means that there is a large amount of unused bandwidth in the management channel. This disclosure advantageously makes use oft his unused bandwidth to pass through signals from user equipment that are other than cellular services. More specifically, the teachings of this disclosure enable a pair of conductors of a cellular signal to also simultaneously carry data from a service that is other than cellular such as a Bluetooth or Wi-Fi service by using the unused bandwidth in the management channel for this transmission.

As previously explained in connection with FIG. 3, conventional remote antenna units provide non-cellular services using a GEM. However, the use of the GEM requires a dedicated cable (e.g., fiber optic or metallic wire pair) to support the Wi-Fi services. This dedicated cable is additional to the cable (e.g., fiber optic or metallic wire pair) used to support the cellular services. This disclosure avoids the need for a second pair of optical fibers because it advantageously enables the non-cellular services to be transmitted over the same cable (e.g., fiber optic or metallic wire pair) as the cellular services using the management channel as the medium for transmission. In essence, this disclosure leverages available bandwidth in the management channel that is not being used to control and/or monitor cellular signals to throughput performance data from a utility equipment over a non-cellular medium, like Wi-Fi.

Figure 7:
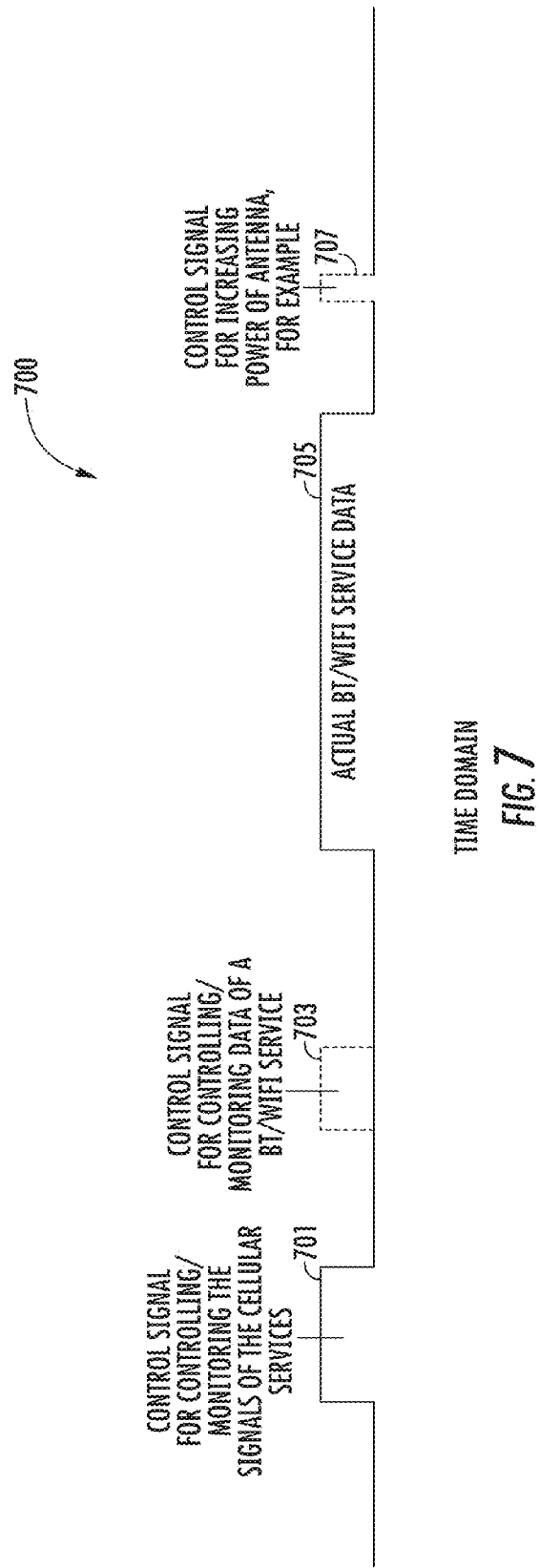
FIG. 7 shows a time domain depiction of an illustrative management channel according to this disclosure.

To enable this feature of this disclosure, the management channel advantageously includes a first field of data for controlling or monitoring the signal of the cellular service and a second field of data including the data of a non-cellular service (i.e., data that is transmitted on a non-cellular medium). This is shown in FIG. 7. Specifically, FIG. 7 shows a signal 700 transmitted on the management channel of this disclosure. The signal 700 is depicted in the time domain. The signal 700 includes a first field 701 that contains data for controlling and/or monitoring the signals of the cellular services (which is part of the prior art). The signal further includes a second field 705 that includes data being transmitted over a Bluetooth or Wi-Fi service from the user equipment, to be analyzed/processed by the DAS head end controller in the illustrative example. The signal additionally includes a third field 703 that contains data for controlling and/or monitoring the data of the Bluetooth or Wi-Fi service. A fourth field 707 is also depicted in FIG. 7 for signals for use in controlling components of the distributed antenna system, based on the data acquired from field 705 previously. In FIG. 7, fourth field 707 contains a control signal for increasing the power of an antenna for example.

The management channel of this disclosure makes it possible for both the cellular and non-cellular services to travel over the same conductor (i.e., fiber optic or metal conductor wire pair) that in conventional systems was only used to deliver cellular services. This disclosure obviates the need for a second conductor (i.e., fiber optic or metal conductor wire pair) for transmission of data over a non-cellular medium, such as the kind provided by GEM as previously explained. The tight coupling of both cellular and non-cellular services over the same conductor (i.e., fiber optic or metal conductor wire pair) provide further efficiencies in designing and optimizing a distributed antenna system since design metrics may be focused on the single conductor (i.e., fiber optic or metal conductor wire pair) used to support cellular services instead of being distributed across two conductors (i.e., fiber optic or metal conductor wire pairs)—namely, one conductor to support the cellular services and the second to support non-cellular services.

The distributed antenna system may be programmed to use the actual performance or service data of a user equipment obtained over the non-cellular medium to optimize the system. For example, the system may collect, aggregate, and use of the performance data to optimize the system as explained in greater detail in connection with FIG. 8.

Figure 8:
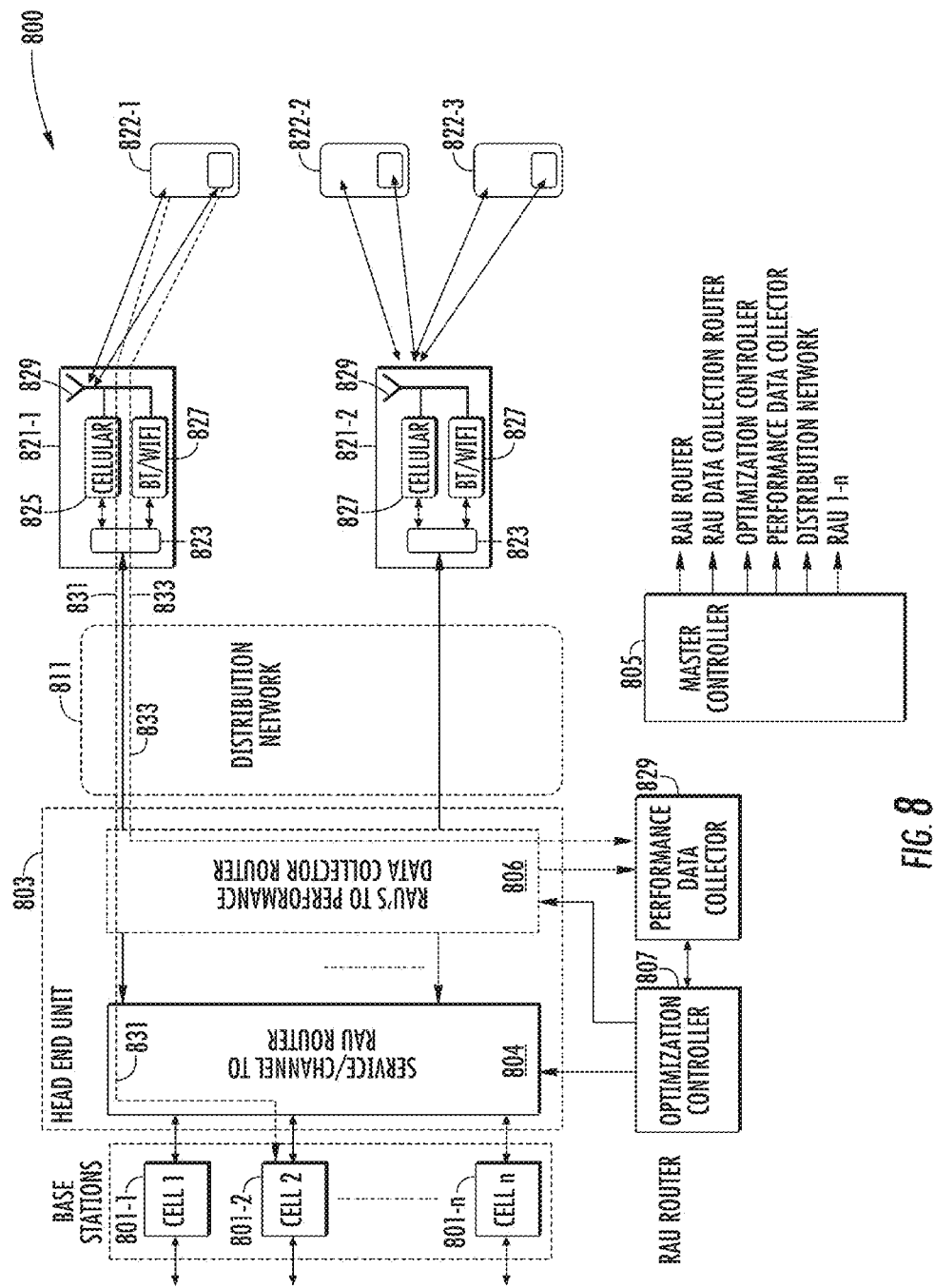
FIG. 8 depicts a distributed antenna system according to the present disclosure, the system including a head-end unit, a distribution system and one or more remote antenna units.

A distributed antenna system according to the present disclosure is depicted schematically in FIG. 8. Distributed antenna system 800 includes a head end unit 803, a distribution network 811 and remote antenna units (RAUs) shown here as a first RAU 821-1 and a second RAU 821-2. The distribution network may include a variety of switches and associated circuitry to route wireless service from a cellular provider to one or more remote antenna users. The distribution network may be used to help balance the service load on the network from a plurality of remote antenna units accessed by a plurality of users, who may readily and repeatedly switch from one coverage area to a different coverage area for the given service. User equipment, such as cellphones 822-1, 822-2 and 822-3 may be served by the nearest RAU, whether the nearest RAU is 821-1 or 821-2.

Cell phone users with user equipment 822-1, 822-2, 822-3 are connected to cellular service providers 801-1, 801-2, . . . 801-n, depending on their subscriptions to such services. With reference to FIG. 8, depicting a telecommunications system for serving a building, the head end unit 803, distribution system 811 and one or more remote antenna units 821-1, 821-2 may serve a portion of a large building, a large building or several buildings located near each other.

Head end unit 803 includes a router 804 for routing services via their respective channels to the user equipment devices, in illustrative case shown in FIG. 8 via pathway 831. These services are the previously described cellular services that are transmitted over the pair of fiber optic cables as previously described. In this embodiment, head end unit 803 may also include a second router 805 for routing performance data collected by the remote antenna units to a performance data collector 809. The performance data would be transmitted over Wi-Fi or other non-cellular service over the same pair of fiber optic cables used to transmit the cellular services as previously described. The path 833 for this collection extends from each user equipment, through the remote antenna units, the distribution network and the head end unit. The cellular link in both downlink and uplink direction is thus depicted by line 831, extending from the user equipment or cell phones 822-1, 822-2, 822-3, through the remote antenna unit 821-1 or 821-2, the distribution network 811, head end unit 803 and appropriate base station/cellular service provider connection 801-1, 801-2, . . . 801-n. The Wi-Fi service downlink and uplink that is other than cellular is depicted by line 833.

Each RAU 821-1, 821-2 includes two radio transceivers 825, 827, one transceiver 825 for providing cellular service through cellular link 831. The second radio transceiver 827 provides for an alternate service according to the present disclosure. This second radio transceiver is intended to communicate with an additional radio capability that is other than a cellular service that is present in the user equipment. An example of an additional radio capability is a Bluetooth radio transceiver or a Wi-Fi radio transceiver in a cellphone or smart phone. The present disclosure is aimed at increasing communications between of all these device through the distributed antenna system and one or more remote antenna units (RAUs) by allowing both cellular services and non-cellular services, such as Wi-Fi services, to travel over the same pair of fiber optic cables as previously described. The present disclosure uses this extra bandwidth in the management channel to gather performance data from each user equipment over Wi-Fi or other non-cellular data service and uses the performance data to improve the quality of the cellular service to the user equipment.

In one embodiment, the data is gathered and uploaded in real time to the router 805 and stored in the performance data collector 809. In other embodiments, or if the second capability is unavailable or in use for other purposes, the data may be stored on the cell phone and then transmitted to the remote antenna unit and ultimately to the performance data collector when the connection is available. Examples of performance data that is already available on user equipment includes received signal strength, signal to noise ratio, uplink throughput from the cellular phone and downlink throughput to the cellular phone. A location of the user equipment is also available, whether by triangulation or other technique. Other data available at the cell phone may also be useful for tracking the quality of the communication and for gauging the performance of network serving the cellular phone or other device with a cellular communications capability.

These performance data are generated in the user equipment. The user equipment then uploads the data using its own Bluetooth transceiver, Wi-Fi transceiver or other transceiver for another service other than cellular. The data follows the performance data collection path 833, from the cell phone or other user equipment 822-1, through remote antenna unit 821-1, through the distribution network 811 and then to the head end unit 803. At the head end unit, the data follow the path 833 through the router 806 to the performance data collector 809.

Antenna 829 is suitable for uplink and downlink routing, i.e., sending and receiving, the transmissions for both the cellular service and the alternate radio service. A single pair of fiber optic cables may be used as the medium for both the cellular communication path 831 and the data collection path 833 for transmission and reception of uplink and downlink of the alternative communications signals to and from the user equipment. FIG. 8 is intended to emphasize the path 833 of the uplinked data from the user equipment to the performance data collector. A metallic conductor or conductors may be used instead of fiber optic cables.

Router 805 receives the data and routes the data to performance data collector 809. Each segment of performance data received from each user equipment includes an identification of which user equipment provided the data and which remote antenna unit was used in transferring the data from the user equipment to the performance data collector 809. Performance data collector 809 may also send instructions to the user equipment via the second channel, which may be termed an alternative radio link, to start or stop gather and sending data. For example, second field 703 shown in FIG. 7 illustrates a control signal that may be sent to the user equipment to start or stop gathering and sending data.

Various embodiments will be further clarified by the following examples of the principal equipment useful in carrying out our disclosure.

As previously described, head end unit 803 also includes the second router 806 for routing the performance data to the performance data collector 809. The primary function of the second router is the timely collection and routing of the performance data from the plurality of remote antenna units served by the head end unit 803. Performance data collection router 806 includes an interface or I/O device (not shown) for connecting to the RAU router 804. Routers 804, 806, optimization controller 807, performance data collector 809, distribution network 811, and RAU 821-2 are controlled by a master controller 805 and equipped with a memory (not shown) The memory may provide at least temporary storage of part or all of the performance data forwarded by the remote antenna units. The memory may also record performance data of the head end unit 803, commands or transmissions from the optimization controller 807, data or events from performance data controller 809 and other events occurring during operations.

The optimization controller 807 receives data from the performance data collector 809, described in greater detail below. The optimization controller is important in using the collected data to improve communications for users with their communications networks. This includes voice and data routing between the base stations 801, e.g., cellular service providers and the individual users of user equipment 822-1, 822-1, 822-3. In order to connect individual users with the cellular service providers, a number of techniques are used, including the head end unit 803 described herein, the distribution network 811 and at least one of a series of remote antenna units 821-1, 821-2. In order to improve service, it is reasonable to look at the performance of the head end unit, the distribution system and the remote antenna units to see whether any improvements can be made in these systems. Adjustments to the system may be provided by the master controller 805.

The optimization controller 807 receives performance data from the performance data collector 809 and the data may be stored in one or more memories. The memory may also include a computer program or other instructions on how to use the data to improve system performance. The optimization controller may include a microprocessor or microcontroller to run the program and calculate or estimate commands to improve system performance. Using the performance data, the optimization controller can instruct a remote antenna unit (RAU) 821-1 with which a cellular user 822-1 is in contact, to change its power level in order to increase or decrease signal strength. Since there could be interference with other nearby base stations, i.e., small cells/macro cells, the optimization controller can increase the 'carrier to interference' for user 822-1 and can also do the same for another user 822-2 by changing the power levels at the remote antenna units, for example.

The optimization controller can also change the routing between specific cell customers and specific remote antenna units to mitigate interference and to obtain the best possible signal strength for all nearby customers or users. The optimization controller can relate the performance data obtained from the user equipment to whichever remote antenna unit, and can also relate the performance data to the locations of the user equipment, which is reported to the performance data collector and are available to the optimization controller. For example, triangulation of the data from the alternative channel may be used to identify a user's location. Of course, these techniques may also be used for more than one user and for all users and user equipment within range of the distributed antenna system its remote antenna units.

The optimization controller may be provided by a supplier of distributed antenna systems or it may be provided by a wireless service provider or allied firm. The controller may also work with an optimization app or application provided to cell phone users. In one embodiment, the performance data may be collected by a software program or app on the cell phone or user equipment of the users. In other embodiments, the remote antenna units, the head end unit or the distributed antenna system may be programmed to periodically query or ping the user equipment to collect the performance data.

Some more sophisticated cell phones, smart phones and tablet-computer type devices have additional communications capabilities. For example, some may include a wireless service processor for wireless service, and may have an additional multiple application processor for other types of communications, e.g., for Bluetooth, Wi-Fi, ZigBee, or other alternative radio communications. The user equipment may also have a memory.

These more sophisticated devices may be such that each of the multiple application processor and the wireless service processor are configured for communicating data over a communication interface to a remote antenna unit. The multiple application processor may be configured to execute an instance of a data service, the data service configured to obtain data on the performance of the cellular network through the remote antenna unit.

Figure 9:
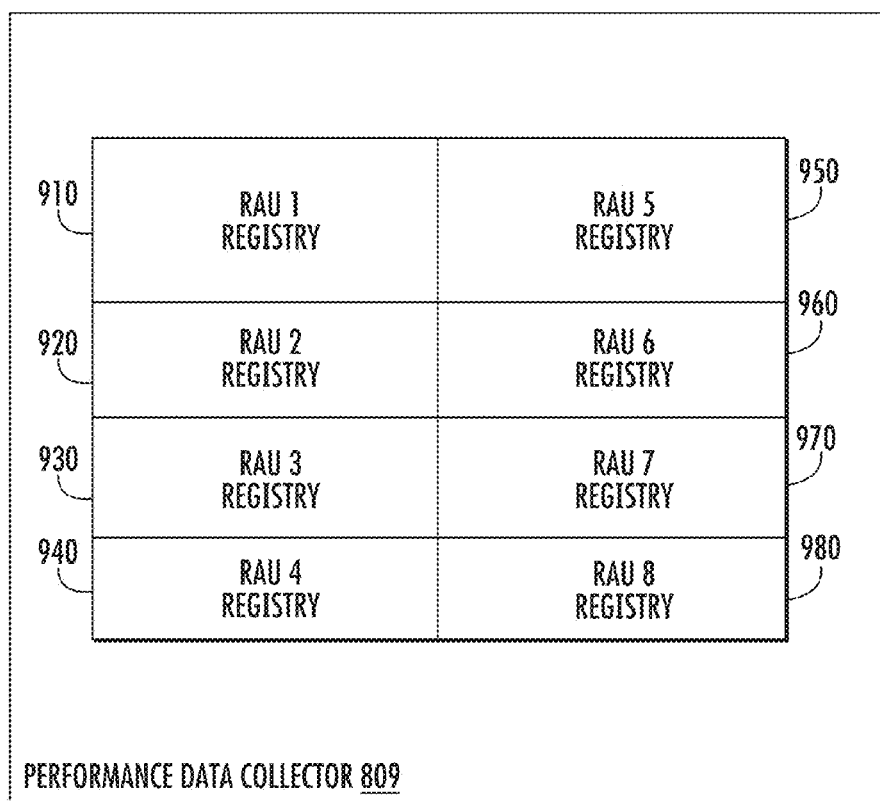
FIG. 9 depicts a data structure of a performance data collector, useful in storing the performance data collected from the remote antenna units of FIG. 8.
Figure 10:
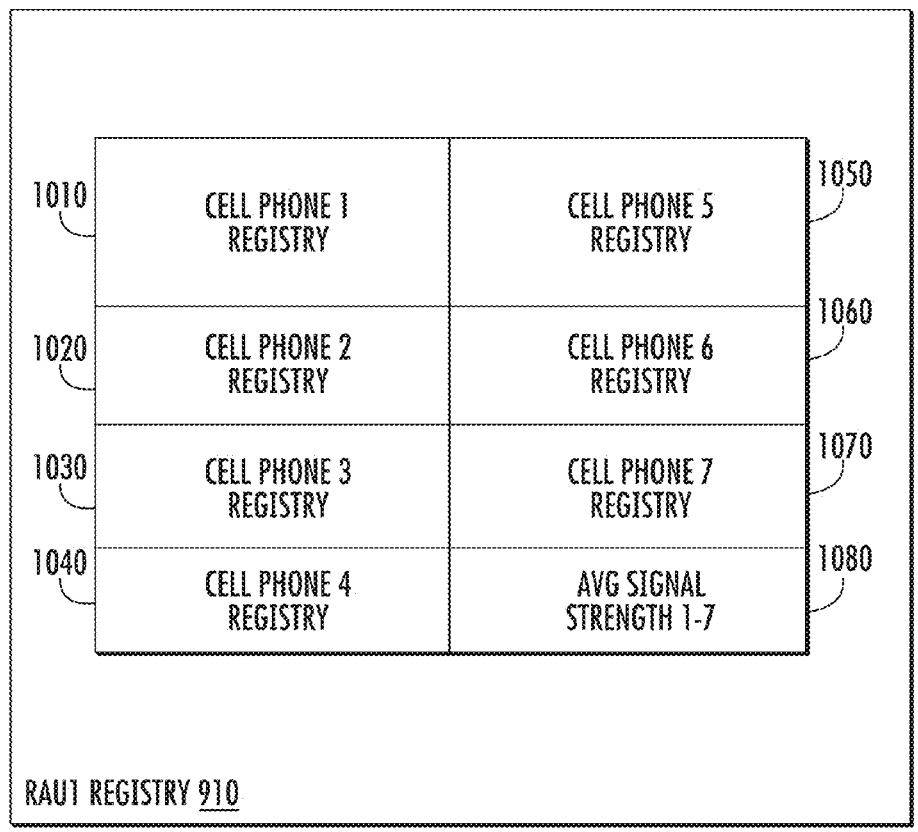
FIG. 10 depicts addition detail of the data structure of the performance data collector of FIG. 9, showing a data registry for each remote antenna unit.
Figure 11:
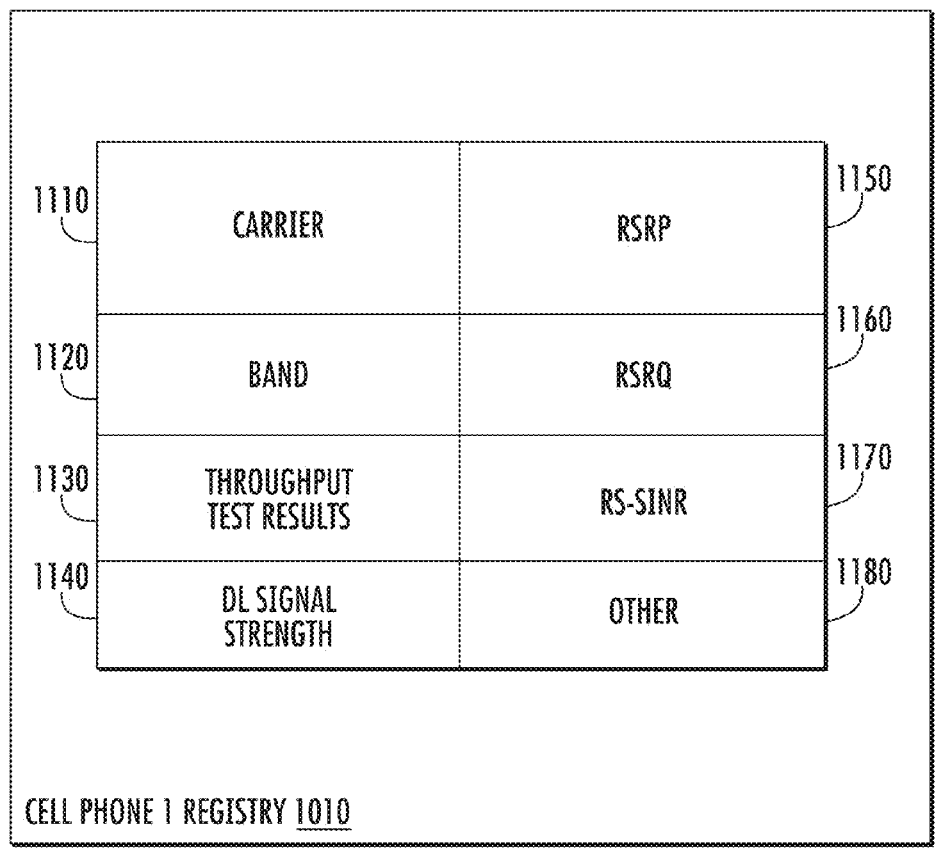
FIG. 11 depicts one cell phone registry of FIG. 10. The registry stores performance data of a cell phone in connection with a particular remote antenna unit according to the present disclosure.

The performance data collector 809 collects and organizes data from the user equipment and remote antenna units. Performance data collector 809 may include a microcontroller for controlling and organizing the flow of data into the collector and storing it. Storage or memory is provided in the performance data controller. As seen in FIGS. 9-11, memory may be organized to store performance data from each remote antenna unit (RAU) served by the distributed antenna system. FIG. 9 depicts a data structure for the performance data collector, including a registry 910 for RAU1, and similar registries or storage files 920 through 980 for each of the other RAUs as shown. The data need not be organized this way, and may be organized in any convenient manner. For example, the data may be organized by user equipment or cell phone with the particular RAU being incidental information. Other ways may also be used to organize and store the performance data.

An illustrative data organizational structure for the registry 910 for RAU1 is detailed in FIG. 10. RAU1 registry 910 includes all the performance data for cellular phones or other devices that are routed through the first RAU, RAU1. As shown, the data may be organized by each user, e.g., a registry 1010 for cell phone 1. RAU1 registry 910 may include registries 1020 through 1070 for cellphone users 1 through 7, in this embodiment. In the illustrative data structure shown in FIG. 10, a registry for average signal strength of cell phones 1-7 is also included. This and/or other important data parameters may be organized or stored in these and other ways. Other parameters may include a measure of interference, quality of service (QoS), downlink signal strength, and so forth. These and other registries to provide information on the performance of cell phones with a distributed antenna system are taught by this disclosure.

Data may be further organized and stored for each cell phone, such as the registry 1010 for cell phone 1, as depicted in FIG. 11. This figure depicts a data structure for cell phone 1 only, organized by a plurality of parameters. In this embodiment, data stored for the parameters include the carrier or service provider 1110 for cell phone 1, frequency band 1120 for that carrier and for this particular cell phone if there is a difference. Parameters or factors may also include throughput test results 1130, downlink signal strength 1140 and RSRP 1150. RSRP stand for reference signal receive power, i.e., average received power, which may include a map of received signal strength. Data stored may also include reference signal received quality (RSRQ) 1160, carrier to interference+noise ratio (SINR) 1170 and SINR based on reference signals, e.g., narrowband and broadband (RS-SINR). Other pertinent performance data and quality of service factors 1180 may also be gathered, stored and used.

The data may be used, as stated, in computer programs stored in master controller 805 or optimization controller 807 or distributed across both or other components in the distributed antenna system. The data may be employed in algorithms in the software to optimize network performance.

Figure 12:
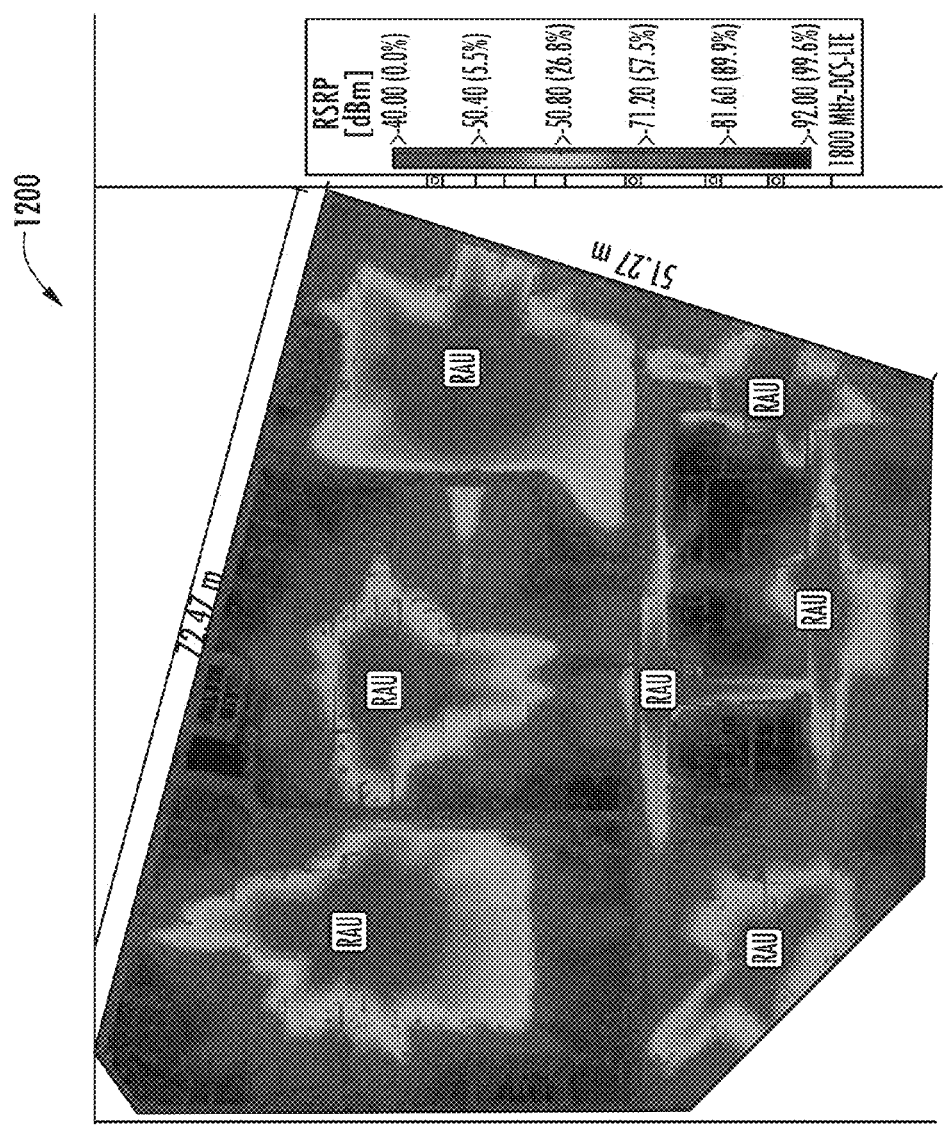
FIG. 12 depicts a heat map showing signal strength for a plurality of remote antenna units in a particular network employing the distributed antenna system of FIG. 8.

A visual use of the data is depicted in FIG. 12 as a "heat map" showing reference signal receive power (RSRP). The heat map of FIG. 12 is a depiction of signal strength data for area building served by LTE Communications, Belle Plaine, Minn., a subsidiary of Verizon Wireless, Wallingford, Conn. Such a heat map can be generated by the acquisition by the distributed antenna system of performance data from user equipment being used in the building. In this example, the signal strength of user equipment with respect to each remote antenna can be recorded by the distributed antenna system over a period of time. The signals strength data from each user with respect to each remote antenna unit over the predetermined period of time can then be averaged and stored in the average strength registries. For example, the average signal strength of the data with respect to remote antenna unit 1 can be stored in the average signal strength registry 1080 depicted in FIG. 10. The distance of the user equipment from the remote antenna unit at the time the data was recorded was also stored in a registry of the remote antenna unit. A color can be then assigned to differing levels of signal strength with red being the strongest signal and blue being the weakest. A software program can then be used to calculate the heat value, (i.e., color value) for each location of the building and render the calculated heat values onto a floor plan of the building.

It will be seen that the heat map provides an administrator with valuable insight into the dynamic performance of the distributed antenna system. By analyzing the heat map, an administrator or service provider may make changes to the distributed antenna system to improve performance. For example, where the footprint of a hot spot on the heat map is smaller than desired, the administrator or provider may increase the power of the associated remote antenna unit. The hardware and techniques described above are very useful in helping to improve cellphone service to cellphone users by optimizing the connections between the distributed antenna system and its remote and antenna units and users of cellphone equipment.

Figure 13:
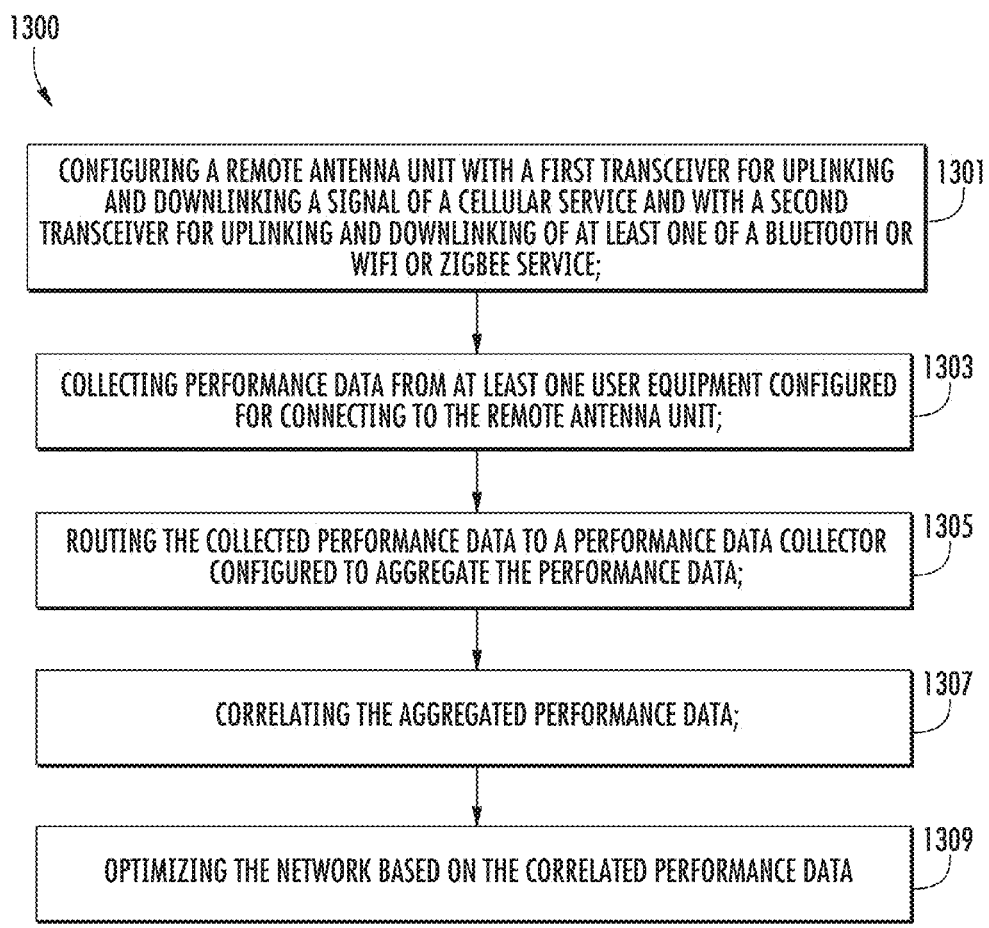
FIG. 13 depicts a method for configuring a distributed antenna system for optimizing network performance for cellular customers according to this disclosure.

One method of accomplishing a better network is depicted in FIG. 13. As shown in the figure, a remote antenna unit useful in the method 1300 is configured 1301 with a first transceiver for uplinking and downlinking a signal of a cellular service and with a second transceiver for uplinking and downlinking at least one alternate service, such as Bluetooth, Wi-Fi or ZigBee. A different service may also be used. Performance data is then collected 1303 from at least one user equipment configured for connecting to the remote antenna unit that is configured with the first and second transceivers. The user equipment may be a cell phone, smart phone, tablet, or other device configured for connecting through a remote antenna unit.

The collected performance data is then routed 1305 to a performance data collector configured to aggregate the performance data. In one example, the performance data collector may be a memory, a database, or other computer data storage medium or storage facility useful in storing and retrieving the performance data. The aggregated performance data is then correlated 1307 and used to optimize 1309 the network based on the correlated performance data. It may be useful to recall that a network and a remote antenna unit typically serve many users, not a single user. In optimizing network performance, it is desirable to connect all users in the most desirable manner and with the least interference. As a result, raising the power level of all remote antenna units may not be the preferred solution, nor may raising the power level of each piece of user equipment the preferred solution.

A network solution may involve raising a power level of one or more remote antenna units, lowering a power level of one or more remote antenna units, switching one or more remote antenna units to a different layer/sector, and so forth. When considering how to optimize the network, there may be a plurality of data, and even some contradictory data. As a result, it may be prudent and useful to consider more than one set of performance data in optimizing the connection between the network and any particular user. To help, optimization data from more than one call or more than one time period may be used. Data may be collected over a period of time and averaged in order arrive at a solution or optimized connection for a given user. The time period may use data collected over several minutes, several hours, several days, or other longer or shorter time period.

Figure 14:
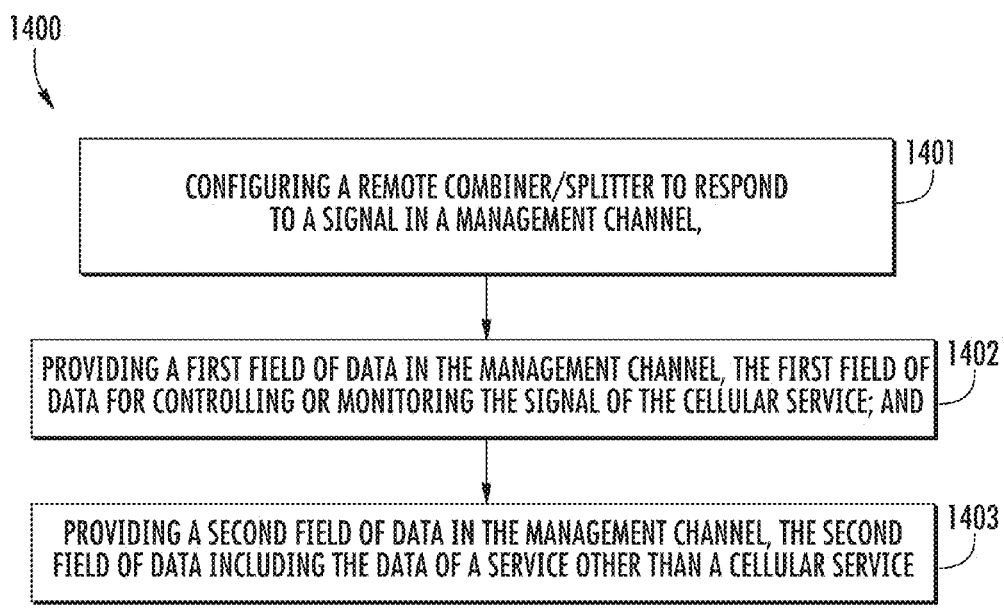
FIG. 14 depicts a method for configuring a remote combiner/splitter to acquire data useful in optimizing network performance according to this disclosure.

Another method for improving network performance is depicted in FIG. 14, which provides additional details for the efforts described in FIG. 13. In the method 1400 of FIG. 14, a remote combiner/splitter is configured 1401 to respond to a signal in a management channel. The method also includes providing 1403 a first field of data in the management channel, the first field of data for controlling or monitoring a signal of a cellular service, e.g., the cellular service described above and provided to users of user equipment. The method also includes providing 1405 a second field of data in the management channel, the second field of data including the data of a service other than a cellular service—indicating a cellular service related parameter.

As discussed above with respect to FIG. 5, a remote antenna unit according to the present disclosure includes capabilities for two radio services, a cellular service and a non-cellular service for communicating performance data for the cellular service. The method of FIG. 14 may be useful in demonstrating how the two services work together to improve performance of the network and performance for the user equipment of a cellphone user.

Gathering performance data from each piece of user equipment a nd routing the data to a performance data collector and to an optimization controller may be very helpful in monitoring and optimizing a distributed antenna system. This is an important advance in educating a distributed antenna system about what is going on with user equipment in the distributed antenna system coverage area. Without this disclosure, the distributed antenna system is a dumb system. It is a physical layer that is not smart. The distributed antenna system merely provides the infrastructure for delivering signals from a base station to an end user. It cannot monitor or control the base station or the user equipment. It knows nothing about how the user equipment is doing in the distributed antenna system coverage area. For example, the distributed antenna system does not know the strength of a signal received by a user equipment. It doesn't know whether the user equipment is making a digital or audio call. The distributed antenna system cannot even tell how many user equipment's are using the distributed antenna system. The service provider knows all this information and may provide it to the distributed antenna system. But the distributed antenna system does not know without education by the providers know this information since the distributed antenna system is effectively no more than a piece of physical infrastructure The alternate channel provided by this disclosure provides the distributed antenna system with the smarts about the user equipment that are in the coverage area of the distributed antenna system. The alternate channel can obtain data from the user equipment on signal quality, whether the user equipment is making a digital or audio call, and even which user equipment is closer to which remote antenna unit in the distributed antenna system. The alternate channel according to this disclosure gives the distributed antenna system smarts on the quality of cellular signal, and a sense of the user experience practiced by the user equipment in its distributed antenna system coverage area.

Thus, the present disclosure provides a method and system for monitoring and optimizing a network that may include configuring a remote antenna unit with a first transceiver for uplinking and downlinking a signal of a cellular service and with a second transceiver for uplinking and downlinking of the signal of at least one of a Bluetooth or Wi-Fi or Zigbee service. Performance data is collected from at least one user equipment configured for connecting to the remote antenna unit. The collected performance data is routed to a performance data collector configured to aggregate the performance data. The aggregated performance data is correlated. The network is optimized based on the correlated performance data.

The method and system of this disclosures provides a distributed antenna system with knowledge or smarts about user equipment in the coverage area of a distributed antenna system. The alternate channel can obtain data from the user equipment concerning signal quality, especially the parameters discussed above with respect to FIG. 11, but also including other parameters. For example, separate data may be available concerning signal or transmission quality in both uplink and downlink channels of user equipment, which band and which channel are being used for uplink and downlink, and so forth. Data that is available at the user equipment and potentially useful in improving the functioning of the network includes all the data discussed above, including whether the user is making an audio call or using a digital channel, which users and user equipment is using which remote antenna unit, information regarding neighboring cells, downlink and uplink throughput, the name of the service provider, and so forth. This use of the alternate service and a primarily one-way data service can be said to provide smarts to the distributed antenna system. This use informs the distributed antenna system of its performance and gives it the feedback necessary to optimize service to a plurality of users by controlling factors within the distributed antenna system and its remote antenna units.

One embodiment of the disclosure relates to a system for managing communication over a network. The system includes a remote antenna unit. The remote antenna unit includes a transceiver configured for uplinking and downlinking a signal of a cellular service; a transceiver configured for uplinking and downlinking data of a non-cellular service; and a combiner/splitter. The combiner/splitter is configured for combining an uplinked signal of the cellular service with an uplinked signal of the data of a non-cellular service onto a cable of a cellular service and for splitting the downlinked signal of the cellular signal from a downlinked signal of the data of a non-cellular service other over a conductor of a cellular service. The combiner/splitter is responsive to a signal in a management channel. The management channel includes a first field of data for controlling or monitoring the signal of the cellular service and a second field of data including the data of a non-cellular service.

The non-cellular service provided by the system may be a Bluetooth or Wi-Fi service. The service may be selected from the group of services consisting of Bluetooth, Wi-Fi, and ZigBee.

The management channel may further include a third field of data for controlling the signal of the service other than a cellular service. The signal for controlling or monitoring the signal of the cellular signal may be a downlink signal. The downlink signal may be issued from a head end unit to the remote antenna unit. The data of the service other than a cellular service may be an uplink signal.

A network optimization system according to this disclosure may include a remote antenna, a router, a performance data collector, and an optimizer controller. The remote antenna unit includes a transceiver configured for uplinking and downlinking a signal of a cellular service, and a transceiver configured for uplinking and downlinking a signal of at least one of a Bluetooth or Wi-Fi or Zigbee service. The router is configured to route performance data collected from at least one user equipment configured for connecting to the remote antenna unit, where the user equipment is configured to execute an instance of a data service configured to collect data on a performance of the network. The performance data collector is configured to aggregate the collected performance data. The optimizer controller is configured to correlate the aggregated performance data to determine adjustments to the network optimization system based on the correlated performance data.

The at least one user equipment includes a multiple application processor, a wireless service processor, and a memory. Each of the multiple application processor and the wireless service processor communicates data over a communication interface to the remote antenna unit. The multiple application processor is configured to execute the instance of the data service for collecting data on the performance of the network.

The optimizer controller is further configured to performing optimization activities. The optimization activities may include instructing the remote antenna unit to change its power level in order to increase or decrease signal strength to the at least one user equipment or improve signal to interference level to the at least one user equipment. The optimization activities may include changing the routing between specific cellular capacity sources and groups of remote antenna units upon detection of predefined number of user equipment in the coverage area of specific remote antennas; e.g. dynamic/real time sectorization/layering.

The remote antenna unit may provide a first remote antenna unit and the optimization activities may include instructing the router to change a routing to the at least one user equipment from the first remote antenna unit to a second remote antenna unit. The changed routing may be for improving uplink noise floor and thus better uplink throughput, or, for frequency re-use.

The remote antenna unit may include a first antenna and a second antenna. The first antenna may be configured for transmitting and receiving cellular signals from and to the cellular transceiver. The second antenna may be configured for transmitting and receiving the at least one of a Bluetooth or Wi-Fi or Zigbee signal from and to the Bluetooth or Wi-Fi service or Zigbee transceiver.

The collected performance data may be accumulated and averaged over a period of time. The period of time may be a period of time selected from the group consisting of, seconds, minutes, hours, and days. The collected performance data may be related to the remote antenna unit and a location of the at least one user equipment. The remote antenna unit may provide a first remote antenna unit and the system may further include a second remote antenna unit. A location of the at least one user equipment may be based upon an interaction of the at least one user equipment with the first remote antenna unit and the second remote antenna unit. The collected performance data may be mapped as a heat map configured for use in optimizing the network off-line.

Another embodiment the disclosure relates to a method for optimizing a network. A method for optimizing a network may include configuring a remote antenna unit with a first transceiver for uplinking and downlinking a signal of a cellular service and with a second transceiver for uplinking and downlinking of the signal of at least one of a Bluetooth or Wi-Fi or Zigbee service. Performance data is collected from at least one user equipment configured for connecting to the remote antenna unit. The collected performance data is routed to a performance data collector configured to aggregate the performance data. The aggregated performance data is correlated. The network is optimized based on the correlated performance data.

The step of routing is performed by a router included in a head end unit. Each of the at least one user equipment includes a multiple application processor, a wireless service processor, and a memory; each of the multiple application processor and the wireless service processor is configured for communicating data over a communication interface to the remote antenna unit. The multiple application processor is configured to execute an instance of a data service. The data service is configured to obtain data on the performance of the network through the remote antenna unit.

The step of optimizing may include the further step of instructing the remote antenna unit to change a power level to increase or decrease signal strength of a downlink signal to a cellular service in order to improve the carrier to interference ratio. The performance data may concern the remote antenna unit and a location of the at least one of the user equipment. The performance data may include at least one datum selected from the group consisting of signal strength, signal to noise ratio, uplink throughput, downlink throughput and/or other data. The method may further include the step of accumulating and averaging the collected performance data over a period of time. The period of time may be a period of time selected from the group consisting of seconds, minutes, hours, and days.

The method may further include the step of mapping the performance data as a heat map. The method may further include the step of optimizing the network on-line or off-line using the heat map. The method may further comprising the steps of: connecting the network to at least one provider of a cellular service and at least one provider of the at least one of a Bluetooth or Wi-Fi or Zigbee service, connecting a head end unit to the at least one provider of the cellular service and the at least one provider of the at least one of a Bluetooth or Wi-Fi or Zigbee service, and connecting the head end unit to the at least one of the user equipment via a distribution network.

The method may further include the step of connecting the distribution network to another of the at least one of the user equipment. The method may further include the step of collecting the performance data collector in real time and further comprising the step of performing the step of optimizing real-time or off-line with an off-line optimization controller. The step of collecting performance data may be accomplished by an application or software functionality in an operating system stored in the memory of the user equipment.

Another method for optimizing a network of this disclosure may include the steps of configuring a remote combiner/splitter to respond to a signal in a management channel. A first field of data may be provided in the management channel. The first field of data is for controlling or monitoring the signal of the cellular service. A second field of data may be provided in the management channel. The second field of data includes the data of a non-cellular service.

The service may be selected from the group of services consisting of Bluetooth, Wi-Fi, and ZigBee. The method may further include the step of providing a third field of data in the management channel for controlling the signal of the service other than a cellular service. The method may further include the step of providing the data of the first field of data by a downlink signal. The method may further include the step of issuing the downlink signal from a head end unit to the remote antenna unit. The method may further include the step of providing the data of the Bluetooth or Wi-Fi or Zigbee service by an uplink signal.

Systems and methods using the present disclosure can realize more effective wireless distribution systems and better utilization of their remote antenna units. Users are better connected to their wireless service providers with a better connection and higher quality signals. The wireless distribution system and the remote antenna units can optimize connections for a plurality of users, not for merely a single user. User equipment from the users themselves provide performance data relating to user interaction with the remote antenna unit, the wireless distribution system and the wireless service provider. The data collected from the users includes identification of the user, the remote antenna unit used and the user's location. The system can thus relate the performance data obtained from user equipment with the remote antenna unit or units that are best able to serve the user. The technique may use location identification techniques or triangulation or RSSI proximity estimation, based on the RSSI of the alternative radio channel, by the remote antenna units.

These advantages are achieved by using a largely-unused communication channel to transmit user equipment performance data that is already available. The user equipment performance data may include reference signal received quality (RSRQ), carrier to interference+noise ratio (SINR) and SINR based on reference signals, e.g., narrowband and broadband (RS-SINR). Using this data, a head end unit controlling distribution through one or more remote antenna units can improve connections, service and reliability for a plurality of end users connecting to wireless service providers. The improvement is generated by an optimization controller working with the head end unit and the remote antenna units. The collected performance data can also be used to generate heat maps indicating where wireless service is adequate or where improvement is possible.

Improvements suggested by the optimization controller may include altering power levels of one or more remote antenna units, switching antenna units to other sectors/layers, thus improving uplink performance among users, and the like.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A network optimization system comprising:
    a remote antenna unit comprising:
        a transceiver configured for uplinking and downlinking a signal of a cellular service;
        a transceiver configured for uplinking and downlinking a signal of at least one of a Bluetooth or Wi-Fi or Zigbee service;
    a router configured to route performance data collected from at least one user equipment configured for connecting to the remote antenna unit, where the user equipment is configured to execute an instance of a data service configured to collect data on a performance of the network;
    a performance data collector configured to aggregate the collected performance data; and
    an optimizer controller configured to correlate the aggregated performance data to determine adjustments to the network optimization system based on the correlated performance data.

2. The network optimization system of claim 1, wherein the at least one user equipment includes a multiple application processor, a wireless service processor and a memory, each of the multiple application processor and the wireless service processor communicating data over a communication interface to the remote antenna unit, the multiple application processor configured to execute the instance of the data service for collecting data on the performance of the network.

3. The network optimization system of claim 1 wherein the optimizer controller is further configured for performing optimization activities.

4. The network optimization system of claim 3 wherein the optimization activities include instructing the remote antenna unit to change its power level in order to increase or decrease signal strength to the at least one user equipment or decrease interference level to another user equipment.

5. The network optimization system of claim 3 wherein the remote antenna unit is a first remote antenna unit and the optimization activities comprise instructing the router to change a routing to the at least one user equipment from the first remote antenna unit to a second remote antenna unit.

6. The network optimization system of claim 5 wherein the changed routing is for mitigating identified interferences.

7. The network optimization system of claim 1 wherein the remote antenna unit includes:
    a first antenna configured for transmitting and receiving cellular signals from and to the cellular transceiver; and
    a second antenna configured for transmitting and receiving the at least one of a Bluetooth or Wi-Fi or Zigbee signal from and to the Bluetooth or Wi-Fi service or Zigbee tranceiver.

8. The network optimization system of claim 1, wherein the collected performance data is accumulated and averaged over a period of time.

9. The network optimization system of claim 1 wherein the collected performance data is mapped as a heat map configured for use in optimizing the network.

10. The network optimization system of claim 9 wherein the mapping occurs in real time.

11. A method for optimizing a network, the method comprising:
    configuring a remote antenna unit with a first transceiver for uplinking and downlinking a signal of a cellular service and with a second transceiver for uplinking and downlinking of the signal of at least one of a Bluetooth or Wi-Fi or Zigbee service;
    collecting performance data from at least one user equipment configured for connecting to the remote antenna unit;
    routing the collected performance data to a performance data collector configured to aggregate the performance data;
    correlating the aggregated performance data; and
    optimizing the network based on the correlated performance data.

12. The method of claim 11, wherein the step of routing is performed by a router included in a head end unit.

13. The method of claim 11, wherein each of the at least one user equipment comprises a multiple application processor, a wireless service processor and a memory; each of the multiple application processor, the wireless service processor and the memory configured for communicating data over a communication interface to the remote antenna unit, and the multiple application processor is configured to execute an instance of a data service, the data service configured to obtain data on a performance of the network through the remote antenna unit.

14. The method of claim 11, the step of optimizing comprising the further step of instructing the remote antenna unit to change a power level to increase or decrease signal strength of a downlink signal to a cellular service in order to decrease the interference.

15. The method of claim 11, wherein the remote antenna unit being a first remote antenna unit, and wherein the step of optimizing comprising the further step of instructing the network to change routing of at least one of the user equipment and another of the at least one of the user equipment between the first remote antenna unit and a second remote antenna unit upon detection of an interference with the signal of a cellular service or the signal of at least one of a Bluetooth or Wi-Fi or Zigbee service.

16. The method of claim 11, wherein the performance data concerns the remote antenna unit and a location of the at least one of the user equipment.

17. The method of claim 11, wherein the performance data comprises at least one datum selected from the group consisting of signal strength, signal to noise ratio, uplink throughput, downlink throughput and data.

18. The method of claim 11, further comprising the step of accumulating and averaging the collected performance data over a period of time.

19. The method of claim 11, further comprising the step of mapping the performance data as a heat map.

20. The method of claim 19, further comprising the step of optimizing the network using the heat map.

21. The method of claim 11, further comprising the steps of:
   connecting the network to at least one provider of a cellular service and at least one provider of the at least one of a Bluetooth or Wi-Fi or Zigbee service,
   connecting a head end unit to the at least one provider of the cellular service and the at least one provider of the at least one of a Bluetooth or Wi-Fi or Zigbee service, and
   connecting the head end unit to the at least one of the user equipment via a distribution network.

22. The network optimization system of claim 1 wherein the router is configured to route the collected performance data to the performance data collector.

23. The network optimization system of claim 1 wherein the remote antenna unit is configured to receive the performance data from the at least one user equipment and transmit the performance data using the transceiver configured for uplinking and downlinking the signal of the at least one of a Bluetooth or Wi-Fi or Zigbee service.

24. The network optimization system of claim 23 wherein the performance data is transmitted over a management channel configured to monitor or control at least one cellular service, wherein the performance data is transmitted using at least one of a Bluetooth or Wi-Fi or Zigbee service but is transmitted over at least one optical fiber cable that is also configured to transmit signals for at least one cellular service.

25. The method of claim 11 wherein the collecting the performance data from the at least one user equipment further comprises receiving the performance data at the remote antenna unit from the at least one user equipment and transmitting the performance data from the remote antenna unit to a router in a head-end unit using the second transceiver configured for uplinking and downlinking a signal of at least one of a Bluetooth or Wi-Fi or Zigbee service.

26. The method of claim 25 wherein transmitting the performance data comprises transmitting the performance data over a management channel configured to monitor or control at least one cellular service, wherein the performance data is transmitted using at least one of a Bluetooth or Wi-Fi or Zigbee service but is transmitted over at least one optical fiber cable that is also configured to transmit signals for at least one cellular service.

* * * * *